(12) United States Patent
Chang et al.

(10) Patent No.: US 10,852,490 B2
(45) Date of Patent: Dec. 1, 2020

(54) FIBER OPTIC CONNECTOR CLIP

(71) Applicant: Senko Advanced Components Inc, Marlborough, MA (US)

(72) Inventors: Jimmy Jun-Fu Chang, Worcester, MA (US); Kazuyoshi Takano, Toyko (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/422,398

(22) Filed: May 24, 2019

(65) Prior Publication Data
US 2019/0377139 A1    Dec. 12, 2019

Related U.S. Application Data

(60) Provisional application No. 62/682,956, filed on Jun. 10, 2018, provisional application No. 62/683,913, filed on Jun. 12, 2018.

(51) Int. Cl.
*G02B 6/00* (2006.01)
*G02B 6/38* (2006.01)
(52) U.S. Cl.
CPC ......... *G02B 6/3898* (2013.01); *G02B 6/3893* (2013.01)

(58) Field of Classification Search
CPC ... G02B 6/3898; G02B 6/3893; G02B 6/3879
See application file for complete search history.

(56) References Cited

U.S. PATENT DOCUMENTS

| | | | |
|---|---|---|---|
| 9,678,283 B1* | 6/2017 | Chang | G02B 6/3879 |
| 2010/0220961 A1* | 9/2010 | de Jong | G02B 6/3879 |
| | | | 385/77 |
| 2012/0308183 A1 | 12/2012 | Irwin et al. | |
| 2014/0169727 A1* | 6/2014 | Veatch | G02B 6/3879 |
| | | | 385/11 |
| 2016/0109661 A1 | 4/2016 | Foung | |
| 2016/0349464 A1 | 12/2016 | Chang et al. | |
| 2018/0045905 A1* | 2/2018 | Cote | G02B 6/3889 |
| 2018/0113259 A1 | 4/2018 | Zhu et al. | |

OTHER PUBLICATIONS

European Patent Application No. 19178741.5, Extended European Search Report dated Feb. 18, 2020, 8 pages.

* cited by examiner

*Primary Examiner* — Ellen E Kim
(74) *Attorney, Agent, or Firm* — Edward S. Jarmolowicz, Esq.

(57) ABSTRACT

An adapter holding a plurality of connectors and a clip positioned around a group of connectors securing the connectors together as a single assembly. The clip removes the group connectors from the adapter upon removal therefrom.

4 Claims, 29 Drawing Sheets

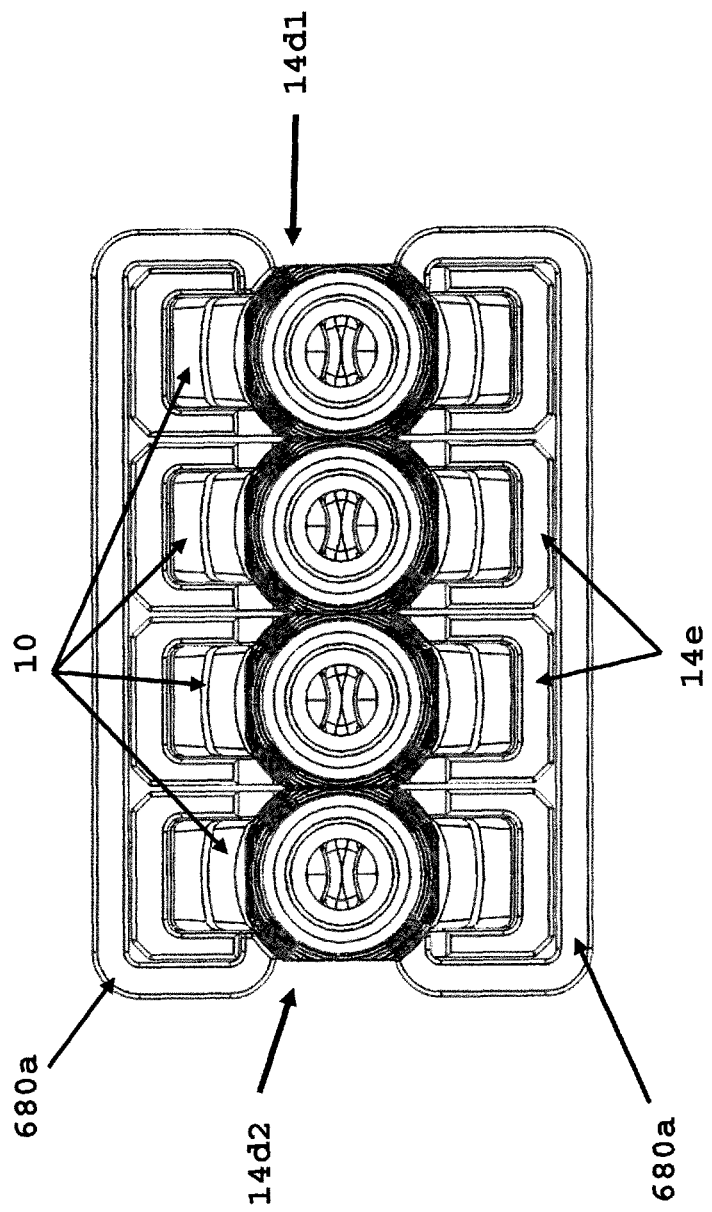

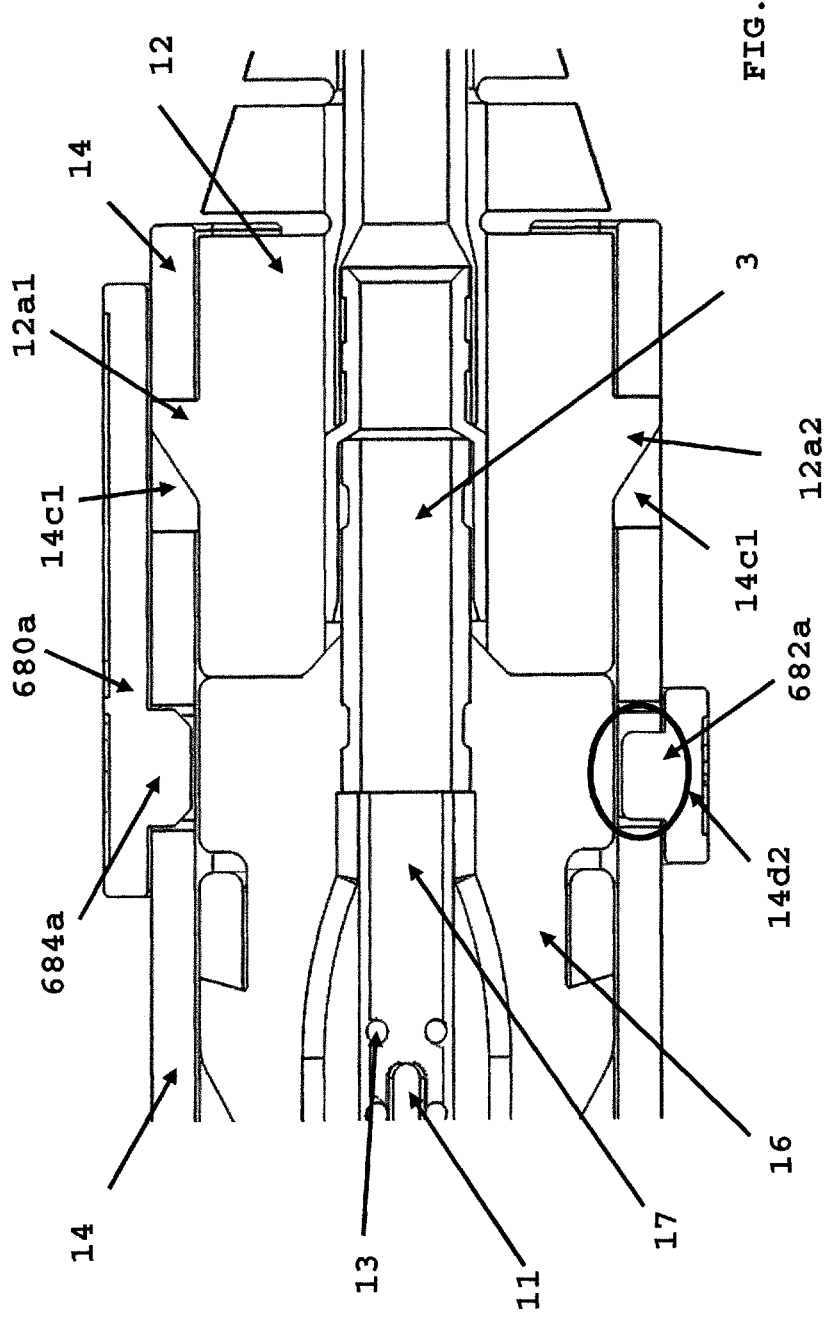

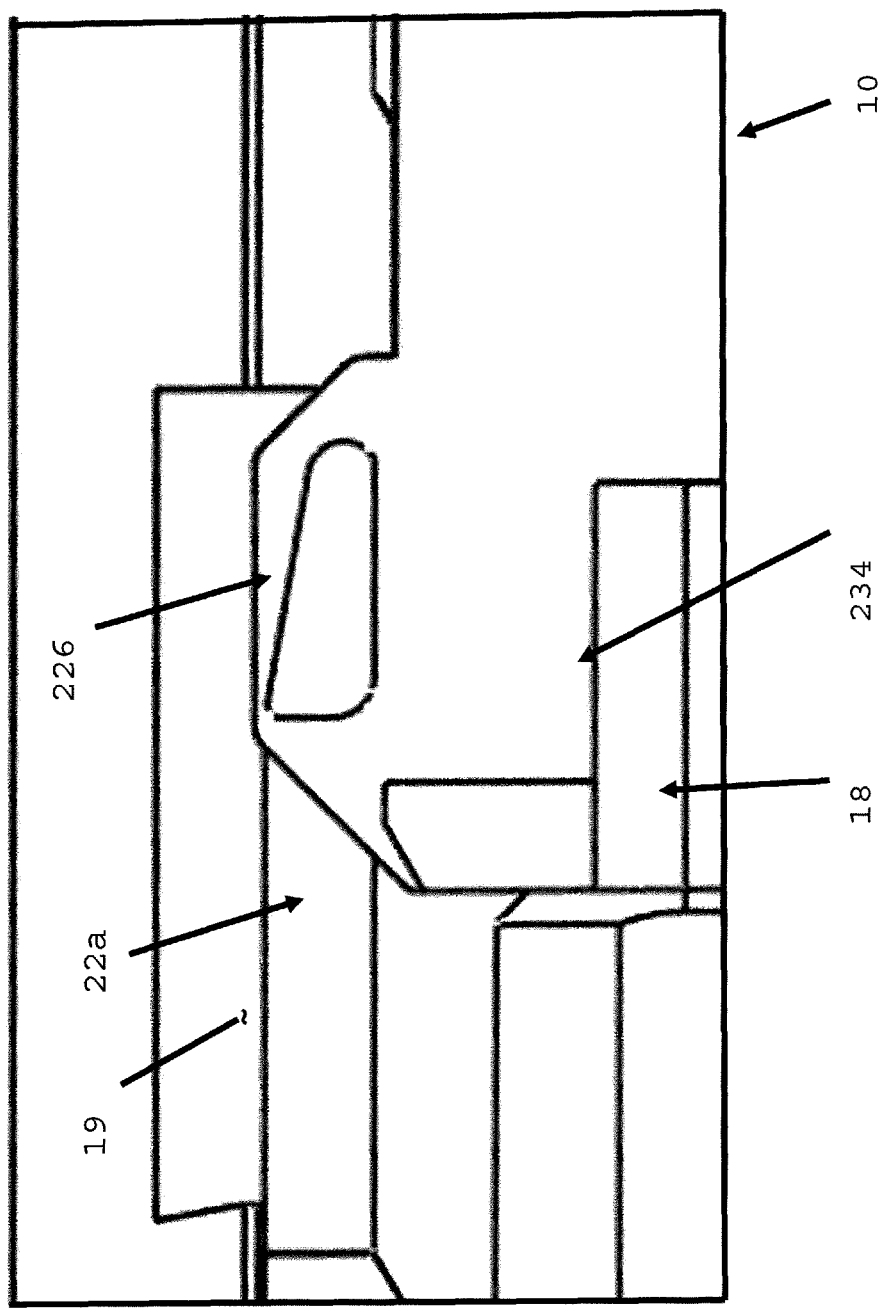

FIBER OPTIC CONNECTOR CLIP

CROSS REFERENCE TO RELATED APPLICATIONS

This patent application claims priority to U.S. Patent Application 62/862,956 filed on Jun. 10, 2018 entitled "Fiber Optic Connector Clip" and to U.S. Patent Application 62/683,913 filed on Jun. 12, 2018 entitled "Fiber Optic Connector Clip", both patent applications are fully incorporated herein by reference.

FIELD OF THE INVENTION

The present disclosure relates generally to ultra-small form factor optical connectors, termed "micro optical connectors," and related connections within adapters and optical transceivers, more specifically a clip securing a plurality of connectors.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connects, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

BRIEF DESCRIPTION OF THE DRAWINGS

FIG. 7 is a front view of a plurality of micro-connectors secured with a clip of FIG. 6A;

FIG. 8 is a fragmentary section view of a clip securing one of a plurality of micro-connectors;

FIGS. 11A-11H are a series of illustrations shown the micro-connector being withdrawn and unlatched from an adapter;

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high density panel without damaging surrounding connectors, accidentally disconnecting surrounding connectors, disrupting transmissions through surrounding connectors, and/or the like. Various embodiments also provide narrow pitch LC duplex connectors and narrow width multi-fiber connectors, for use, for example, with future narrow pitch LC SFPs and future narrow width SFPs. The remote release mechanisms allow use of the narrow pitch LC duplex connectors and narrow width multi-fiber connectors in dense arrays of narrow pitch LC SFPs and narrow width multi-fiber SFPs.

Figure 1:
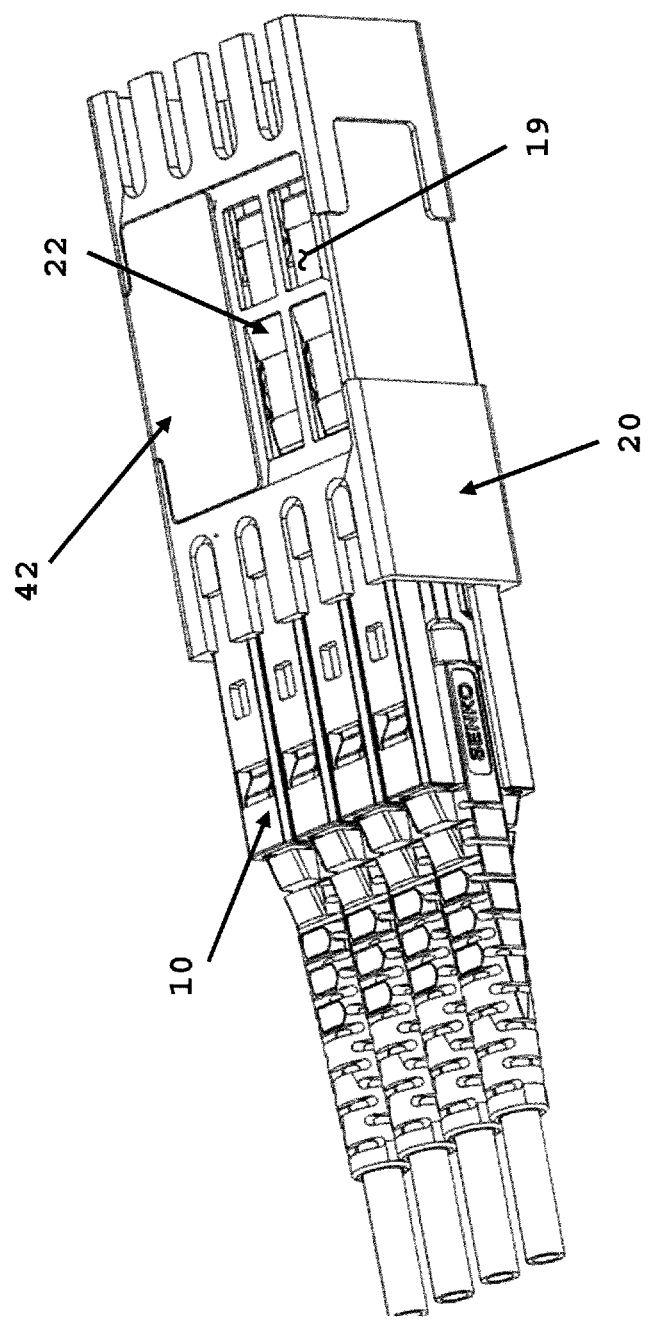
FIG. 1 is a perspective view of a plurality of micro-connectors inserted into an adapter.
Figure 2:
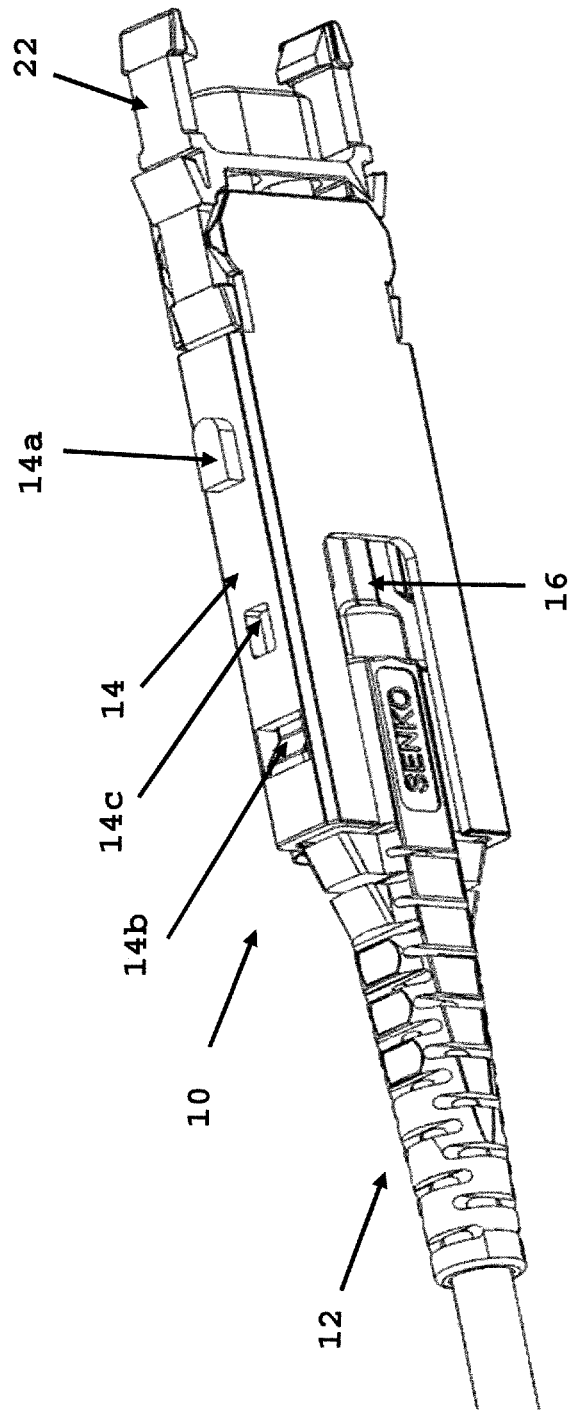
FIG. 2 is a perspective view of a micro-connector secured to an adapter (the shell of the adapter being removed)
Figure 4:
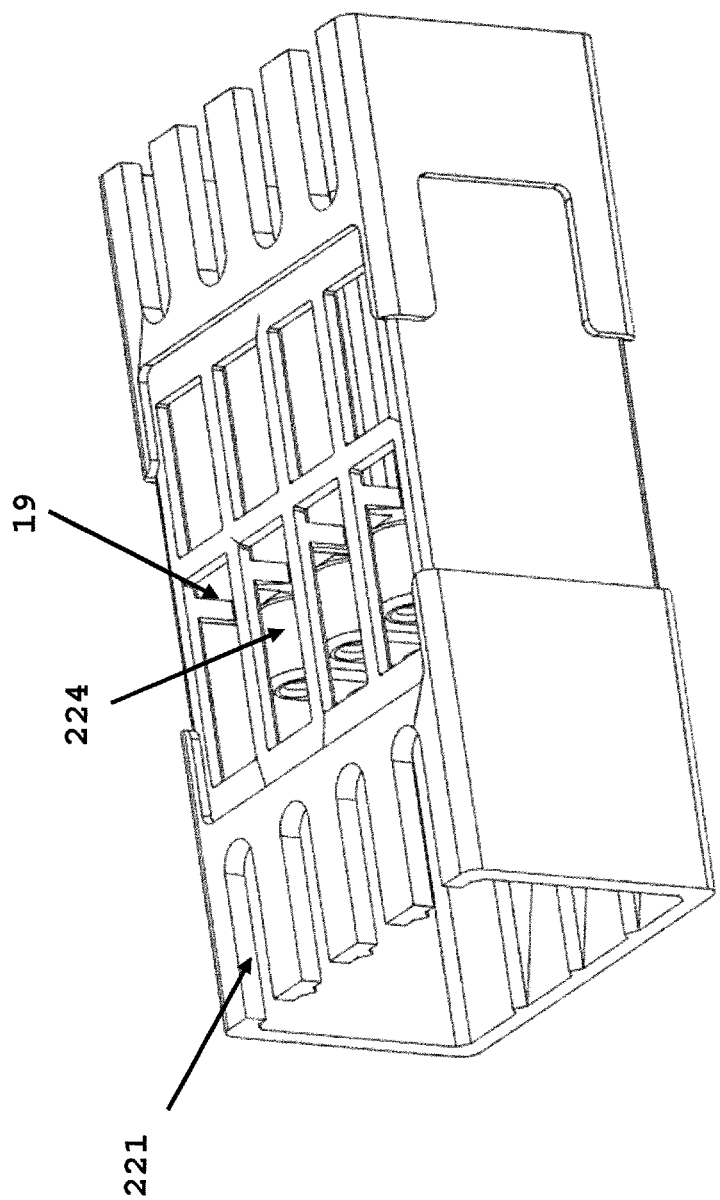
FIG. 4 is a perspective view of an adapter.

FIG. 1 depicts a plurality of micro-connectors 10 within an adapter 20. As will be explained in further detail below, a respective adapter latch 22 secures each of the connectors 10 to the adapter 20. The adapter latch 22 is configured to be fastened in place inside the adapter 20. As explained in further detail below, the adapter latch 22 is configured to facilitate a mechanical connection between a connector 10 and the adapter 20 and to align connectors inserted into opposite ends of the adapter form making an optical connection. The outer body of adapter 20 comprises top and bottom openings 19 along each socket of the adapter. A pair of panel clips 42 can be mounted on the outer body of the adapter 20 over the openings 19. FIG. 2 depicts a micro-connector 10 with a boot 12. Connector 10 has an outer housing 14 that accepts the boot 12 at a rear end of the housing 14, while the proximal end of housing 14 is latched to adapter latch 22. Outer housing 14 has an alignment key 14a accepted by an alignment slot 221 (FIG. 4) to ensure a micro-connector 10 does not become misaligned upon inserted into an adapter 20 port. Each housing 14 has a clip opening or slot 14b1 (FIG. 5) that accepts a corresponding alignment protrusion (684a-684d) as shown in FIG. 6C. Alignment protrusion helps further align a connector within an adapter at a front end of connector 10, and centers clip 680a onto connectors 10 (FIG. 7). FIG. 4 depicts an adapter 20. Adapter 20 has an alignment slot 221 corresponding that accepts an alignment key 14a on an outer housing 14 of connector 10. Upon inserting a connector 10 into an adapter port, a ferrule (not shown) is secured within an alignment sleeve holder 224.

Figure 3:
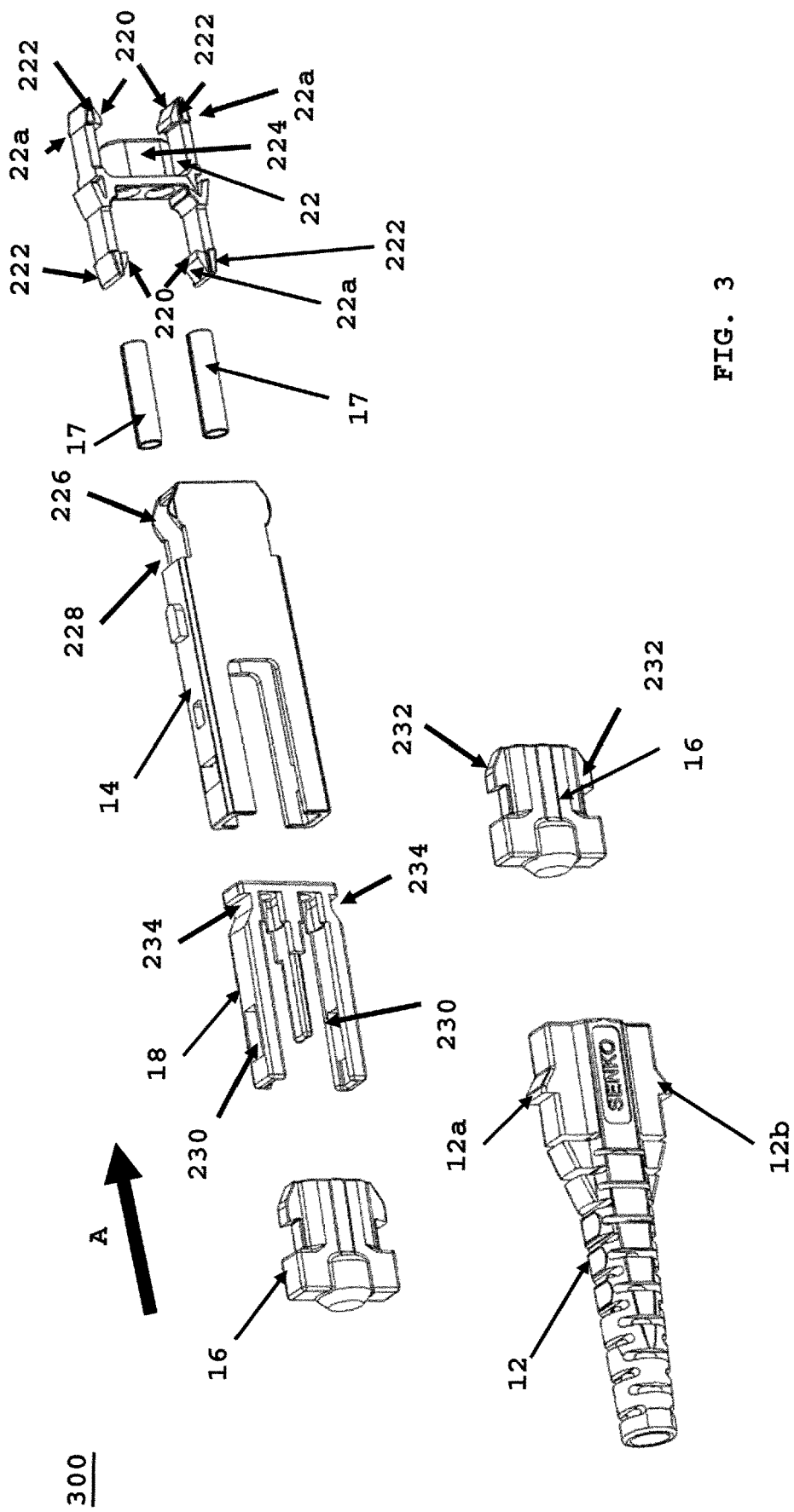
FIG. 3 is an exploded view of the micro-connector and the adapter latch.

FIG. 3 depicts connector 10 which is assembled in direction of arrow "A". Ferrule sleeves 17 accept ferrules 11 (refer to FIG. 8) and this assembly is biased forward by a spring 13. Ferrule sleeve 17 is inserted into alignment sleeve holder 24. This helps ensure a ferrule tip is perpendicular to an opposing ferrule tip for maximum signal transmission. Ferrule assembly is accepted at a front end of outer housing 14. A connector body 18 (front body) accepts ferrule assembly at a front end, and a back body 16 at rear end. Connector front body 18 secures and supports the ferrule assembly, and back body 16 interconnects a fiber cable containing a signal optical fiber (not shown). Front end of boot 12 mates with a rear end of back body 16. Back body 16 has a channel that receives fiber cable 3. Referring to FIG. 18, fiber cable 3 is shown inserted into channel of back body 16.

Figure 5:
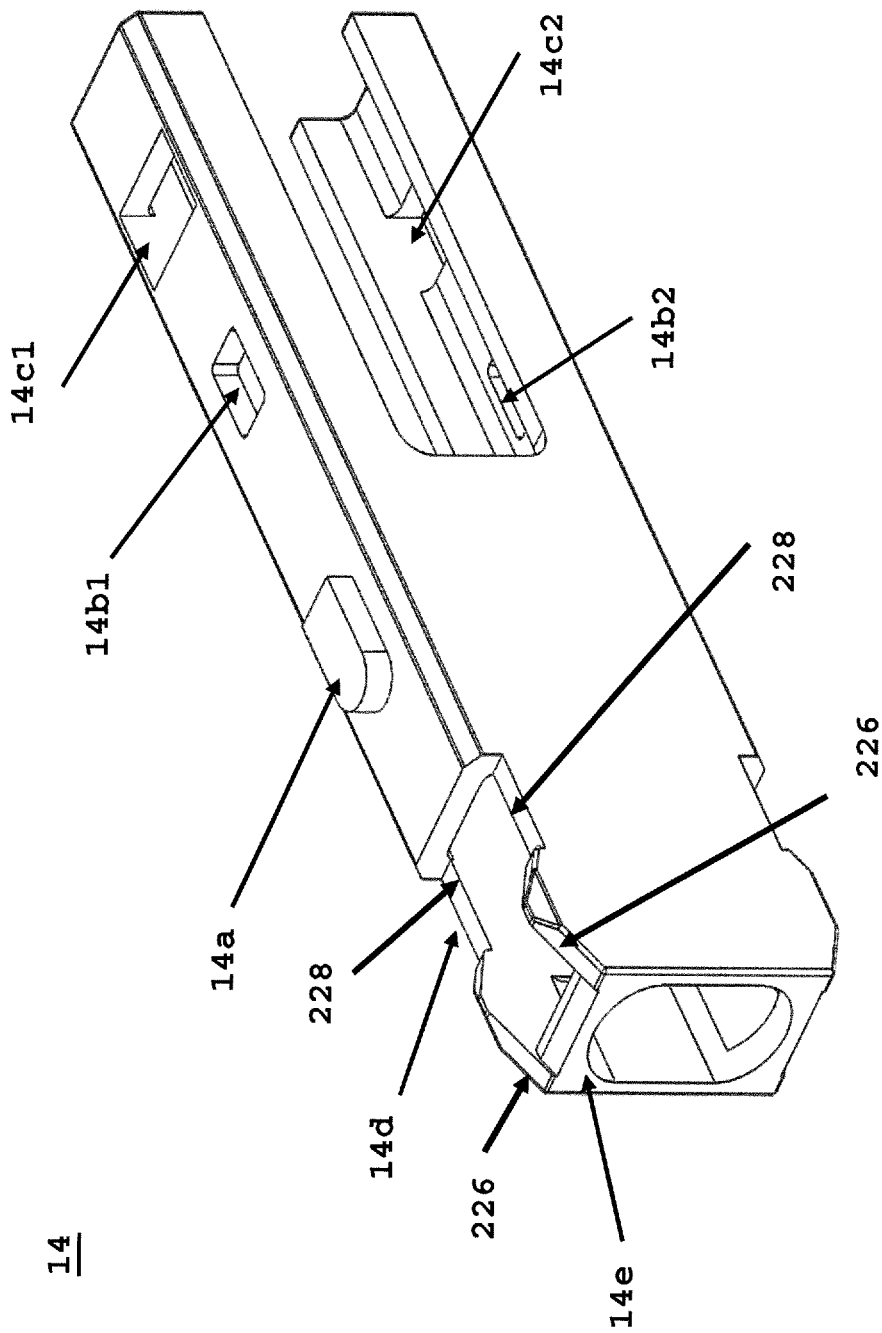
FIG. 5 is a perspective view of the outer housing of the micro-connector.
Figure 6C:
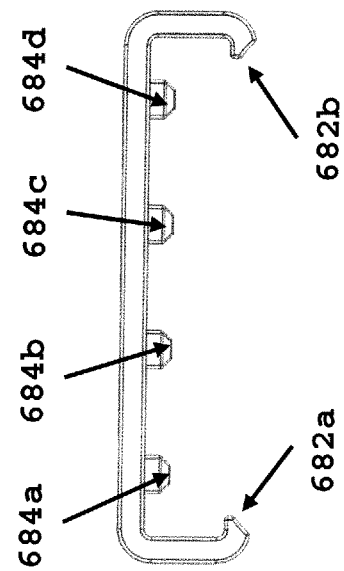
FIG. 6C is a front view of FIG. 6A.

FIG. 5 depicts outer housing 14 comprising an alignment key 14a, a pair of opposing slots 14b1, 14b2 accept clip protrusions 684a-684d (refer to FIG. 6C), an opening 14c1 that accepts a boot hook 12a (refer to FIG. 3). Hook 12a secures boot assembly 12 within outer housing 14 at a rear end portion of the outer housing. Recess 14d receives adapter hook 22a that secures a front end of the connector 10 within an adapter 20 port.

Figure 6A:
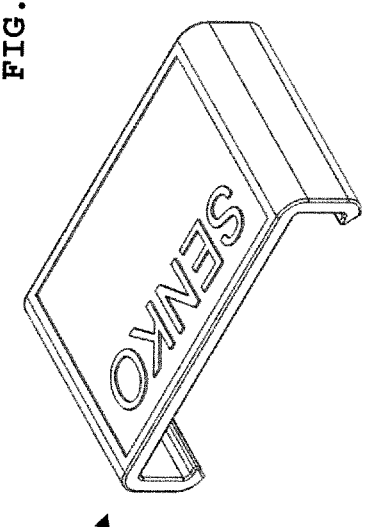
FIG. 6A is a top view of a micro-connector clip.
Figure 6B:
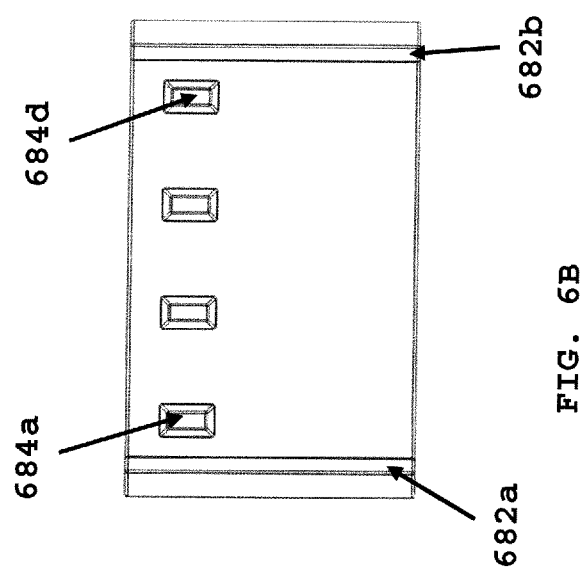
FIG. 6B is a bottom of FIG. 6A.

FIG. 6A depicts a clip 680a used to secure a plurality of connectors 10 inserted into an adapter 20. Clip 680a gangs together a plurality of connectors 10 allowing a user to remove the connectors from adapter 20. Clip 680a also prevents connector misalignment when bumped or compressed at boot 12. FIG. 6B depicts underside of clip 680a showing a plurality of protrusions. Each protrusion 684a-684b aids in securing clip onto a group of connectors 10 while inserted into an adapter. FIG. 6C depicts a front view of clip 680a, a hook 682a, 682b is formed on either side. The hooks are at an end of a corresponding arm that is configured to wrap around housing and snap into opening 14c2.

FIG. 7 depicts a plurality of connectors 10 with a clip 680a securing connectors 10 at a bottom and top side. FIG. 8 depicts connector 10 cut along a longitudinal axis with boot 12 secured into housing 14. Boot hook 12a1 is accepted into housing opening 14c1 and boot hook 12a2 into opening 14c2. This secures boot 12 within housing 14. Clip protrusion 684a is accepted into slot 14d1, and clip hook 682a snaps into slot 14d2 on opposite side of connector housing 14.

Referring again to FIG. 3, additional details of the adapter latch 22 will now be briefly described. The adapter latch 22 has a first end portion and a second end portion. Each of the first and second end portions of the adapter latch 22 comprises opposed upper and lower hooks 22a (broadly, opposed first and second hooks). Each hook 22a comprises a central locking tab 220 that projects inward toward the opposing hook and wings 222 that project laterally outward from the central locking tab 220. Each of the hooks 22a includes an arm that extends longitudinally from a central wall of the adapter latch to a free end portion that defines the central locking tab 220 and the wings 222. Alignment sleeve holder 224 is configured for receiving portions of the ferrule sleeves 17 therein is located between an opposed pair of the hooks 22a at one end portion of the adapter latch 22a. When the adapter latch 22 is fastened to the adapter 20, the sleeve holder 224 is positioned on an opposite side of the central wall of the adapter latch 22 from a respective sleeve holder 24 that is defined by the outer body of the adapter. Within each socket of the adapter 20, the two alignment sleeve holders 224, 224 (opposite side not shown) are substantially mirror images of one another and are arranged in register such that the ferrule sleeves 17 are received in one or more aligned openings defined in the sleeve holders.

Referring again to FIG. 5, the outer housing 14 has a front end portion that is configured to be slidably received in a socket of the adapter 22. The front end portion of the outer housing 14 comprises a front wall 14e that defines an opening that is configured to slidably receive either of alignment sleeve holders 24, 224 when the connector 10 is inserted into the adapter 20. Top and bottom edge margins of the front end portion of the outer housing 14 respectively define top and bottom openings 14d (previously referred to herein as recesses). Each of the top and bottom edge margins includes a camming segment 226 and a relieved segment 228. Each camming segment 226 includes a front section that slopes forward from an apex and a rear section that slopes rearward from the apex toward the relieved segment 228. As will be explained in further detail below, the camming segment 226 is configured to function as a latch actuator that unlatches the adapter latch 22 from the connector 10 when the connector is pulled rearwardly from the adapter 20.

Referring again to FIG. 3, connector front body 18 has a front end portion and a rear end portion. The rear end portion of the connector front body 18 comprises top and bottom leg portions (broadly, first and second leg portions) that are spaced apart from one another on opposite sides of the connector body. Each of the top and bottom leg portions defines an opening 230 adjacent the rear end of the connector front body 18. Each opening 230 is configured for receiving respective prong 232 of the back body 16 therein to connect the back body to the connector front body 18. A front end portion of the connector front body 18 includes a forward facing wall and top and bottom locking recesses 234 (broadly, first and second locking recesses) that are configured for lockingly receiving a pair of locking tabs 220 of the adapter latch 22 as will be described in further detail below. The connector front body 18 is configured to be slidably received in the outer housing 14. The connector front body 18 is slidable relative to the outer housing 14 from a front relative position in which the front end wall of the connector body engages a front wall 14e of the outer housing (FIG. 10A) to a rear relative position in which the front end wall of the connector body is spaced apart rearwardly of the front wall of the outer housing (FIG. 11A). In the front relative position, the locking latch recesses 234 are generally aligned with the camming sections 226 of the outer housing 14. In the rear relative position, the latch recesses 234 are generally aligned with the relieved segments 228 of the outer housing 14.

Figure 9:
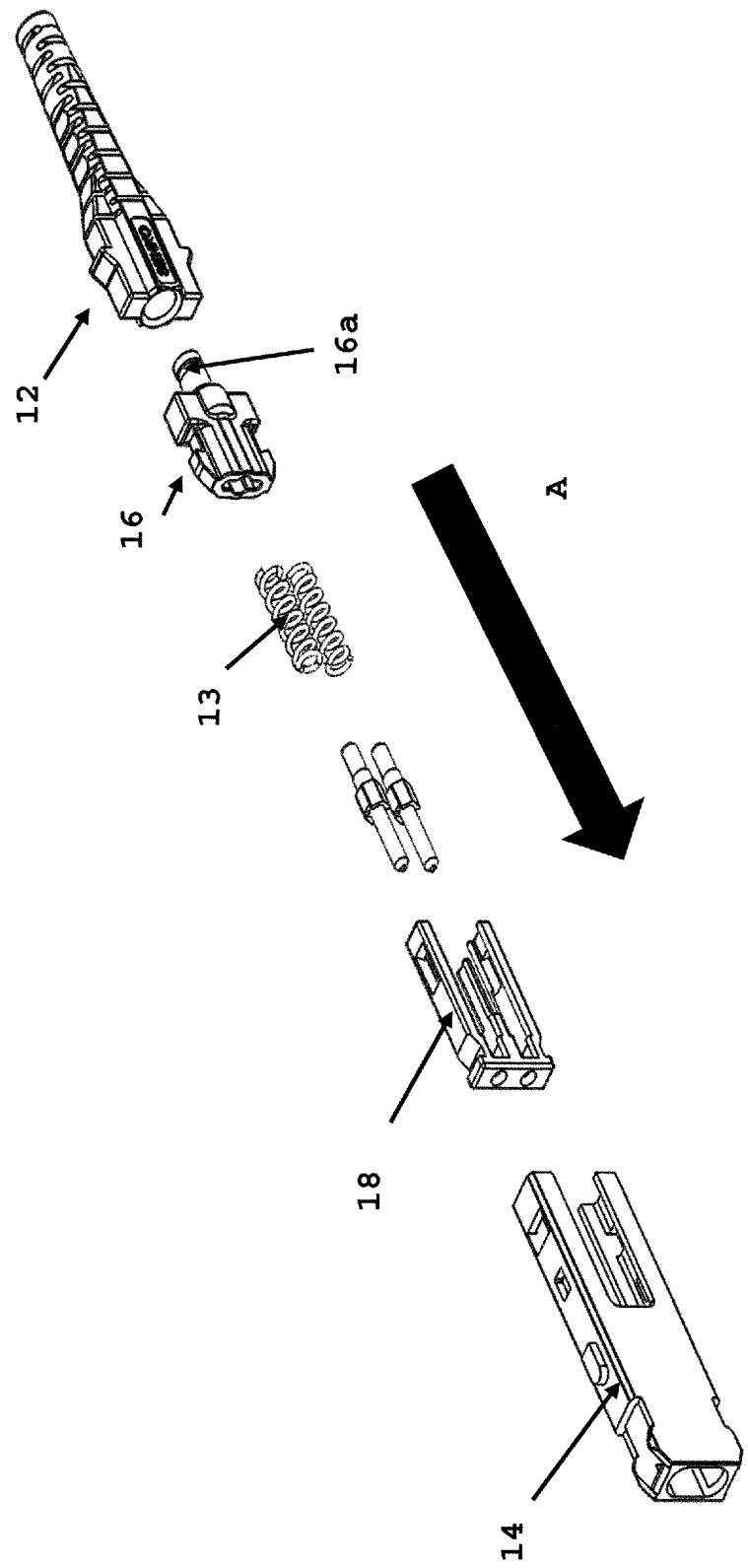
FIG. 9 is an exploded perspective of the micro-connector.

FIG. 9 is an exploded view of connector 10. Connector 10 is assembled in direction of "A". Housing 14 accepts front body 18. Front body 18 has substantially open sidewalls to allow a small profile connector. This allows more connectors to be inserted into a standard adapter footprint. Front body 18 receives ferrule assemblies biased by spring 13. Back body 16 is secured into connector housing 14 at proximal opening in housing 14. Boot 12 with opposing wings biases forward back body 16 and each wing is secured in housing opening at a distal end of connector housing. Back post 16a accepts cable.

Figure 10A:
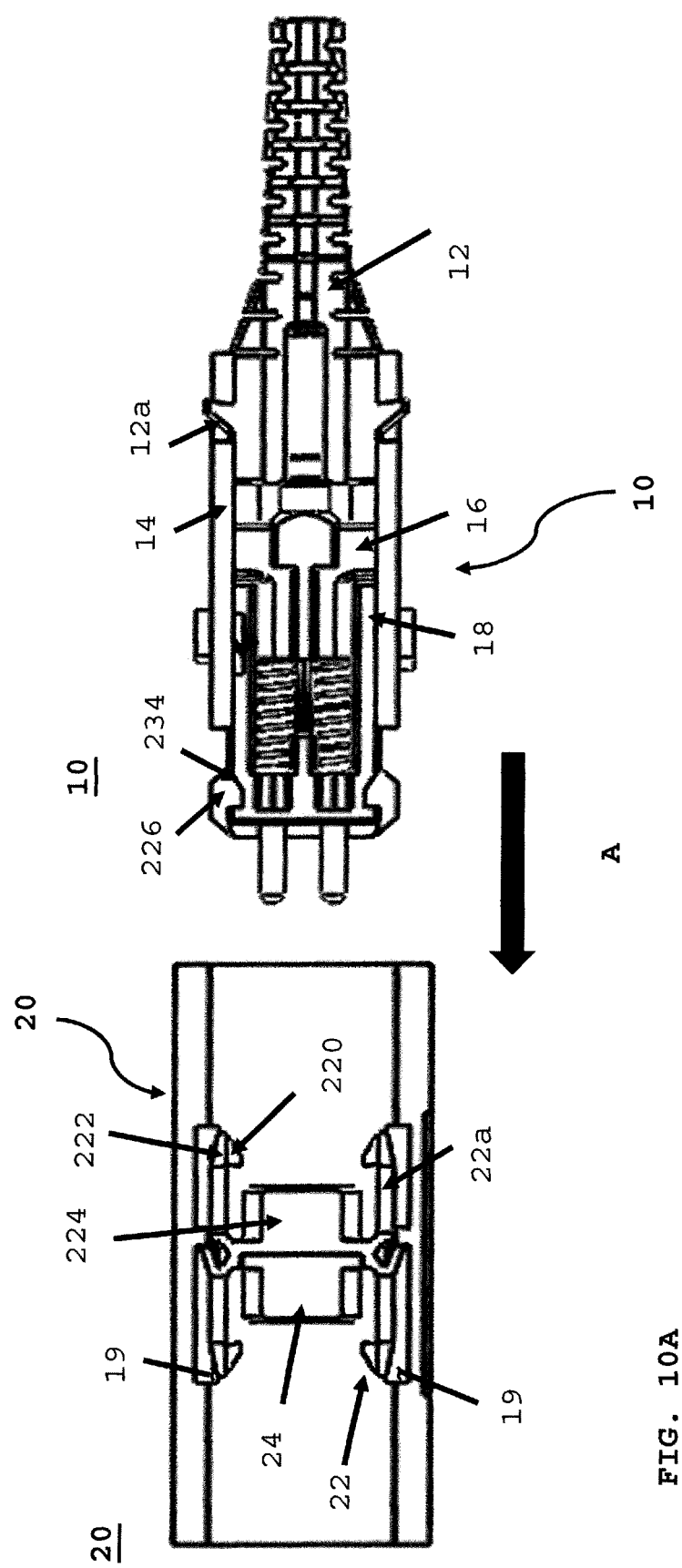
FIGS. 10A-10F are a series of illustrations showing the micro-connector being inserted into and latched to an adapter.
Figure 10B:
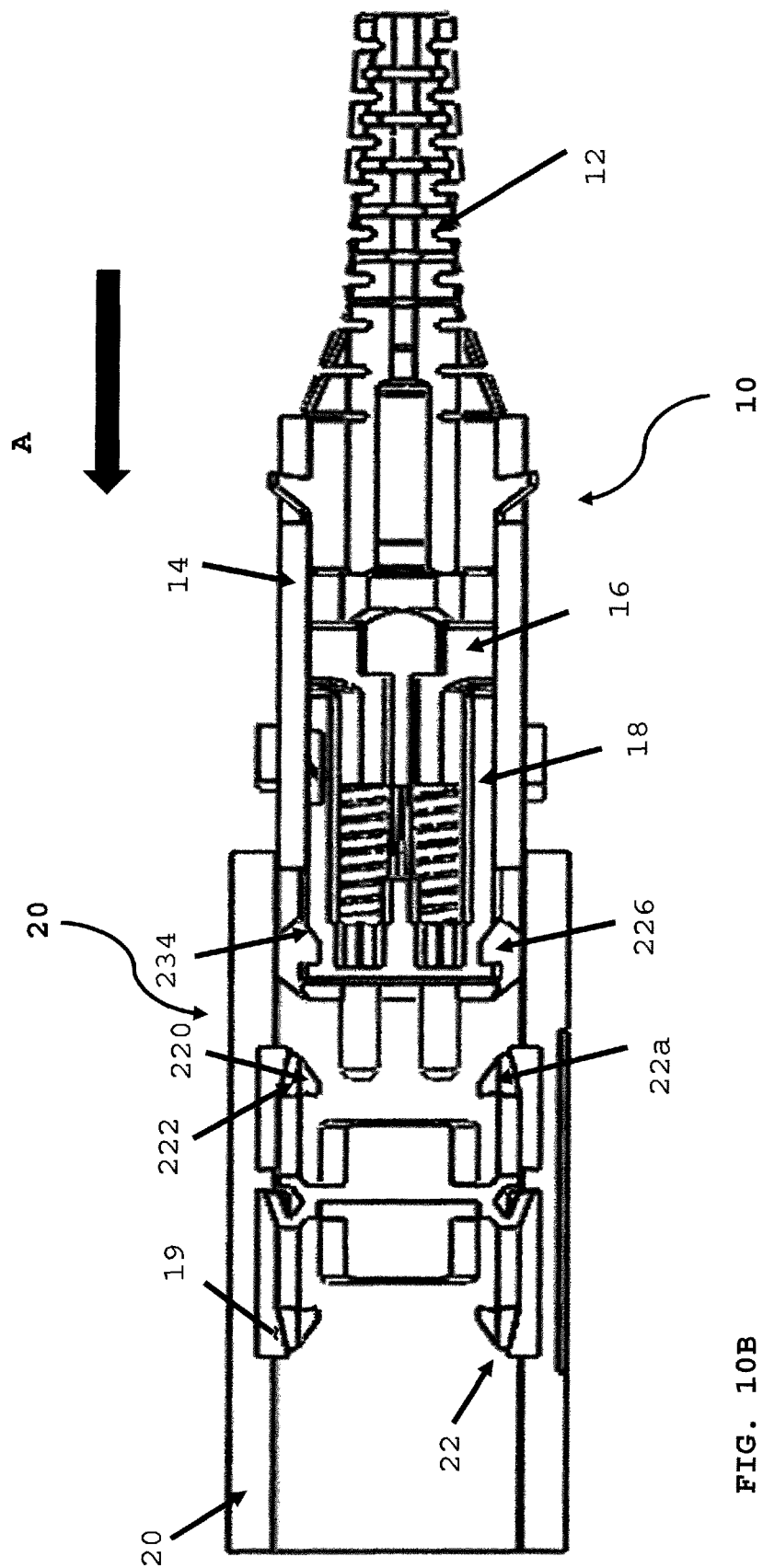
Figure 10C:
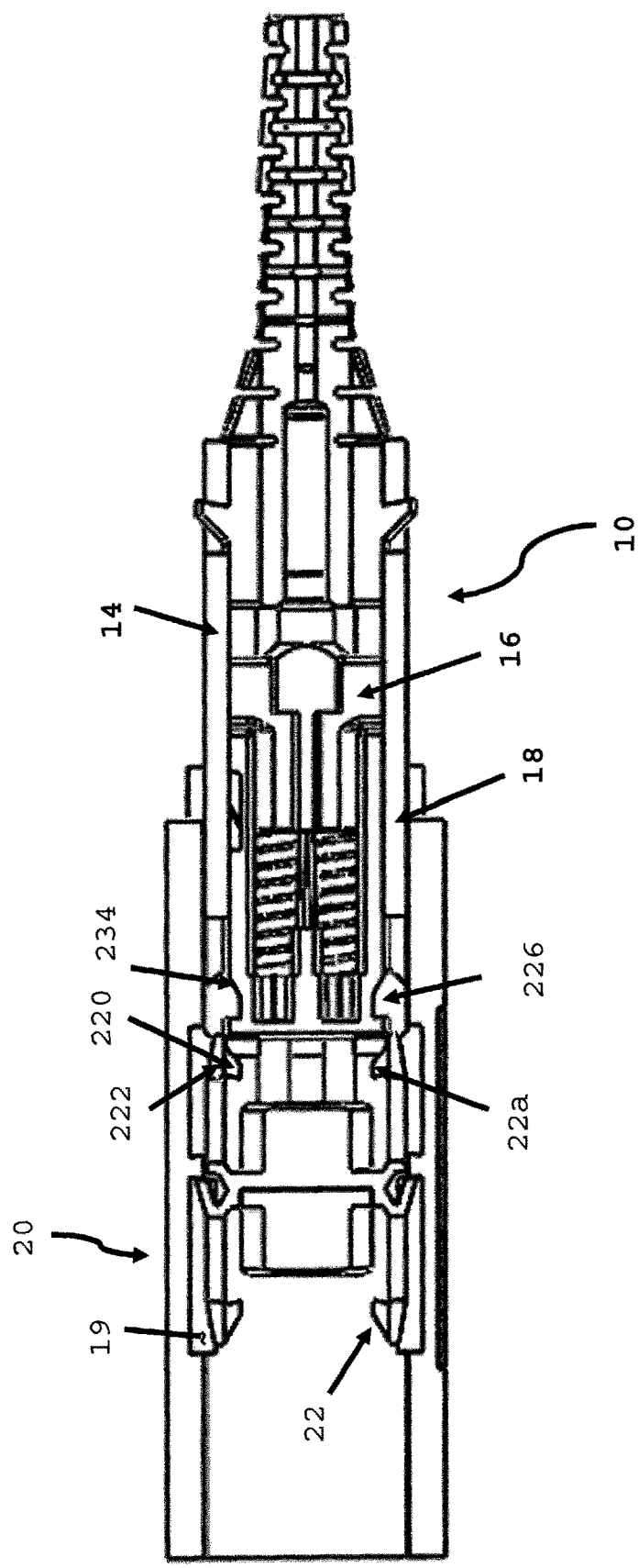

Referring to FIGS. 10A-10F, an example of the connector 10 being inserted into the adapter 20 will now be briefly described. Referring to FIG. 10A, in the illustrated example, the connector 10 is inserted into the side of the adapter 20 including the adapter latch 22 and alignment sleeve holder 224. It will be appreciated that the connector 10 also be inserted into and withdrawn from the opposite side of the adapter 20 in the same manner that is described herein, except that the function of alignment sleeve holder 224 is replaced by the sleeve holder 24. Initially, the connector 10 is configured so that the connector front body 18 is in the forward relative position with respect to the outer housing 14. In this position, the tabs 12A of the boot 12 engage the rear end portion of the outer housing 14 such that a user can insert the connector 10 into the adapter 20 by gripping the cable boot 12 and pushing the connector forward into the adapter. FIG. 10B depicts connector 10 partially inserted in adapter 20. Adapter latch 22 wing 222 is received in connector recess 234, which secures connector 10 into adapter, as depicted in 10D. FIG. 10C depicts connector 10 abutting adapter latch 22 wings 222 and front wall 14 lifts latch 22 prior to latch 22 being received in recess 234.

Figure 10D:
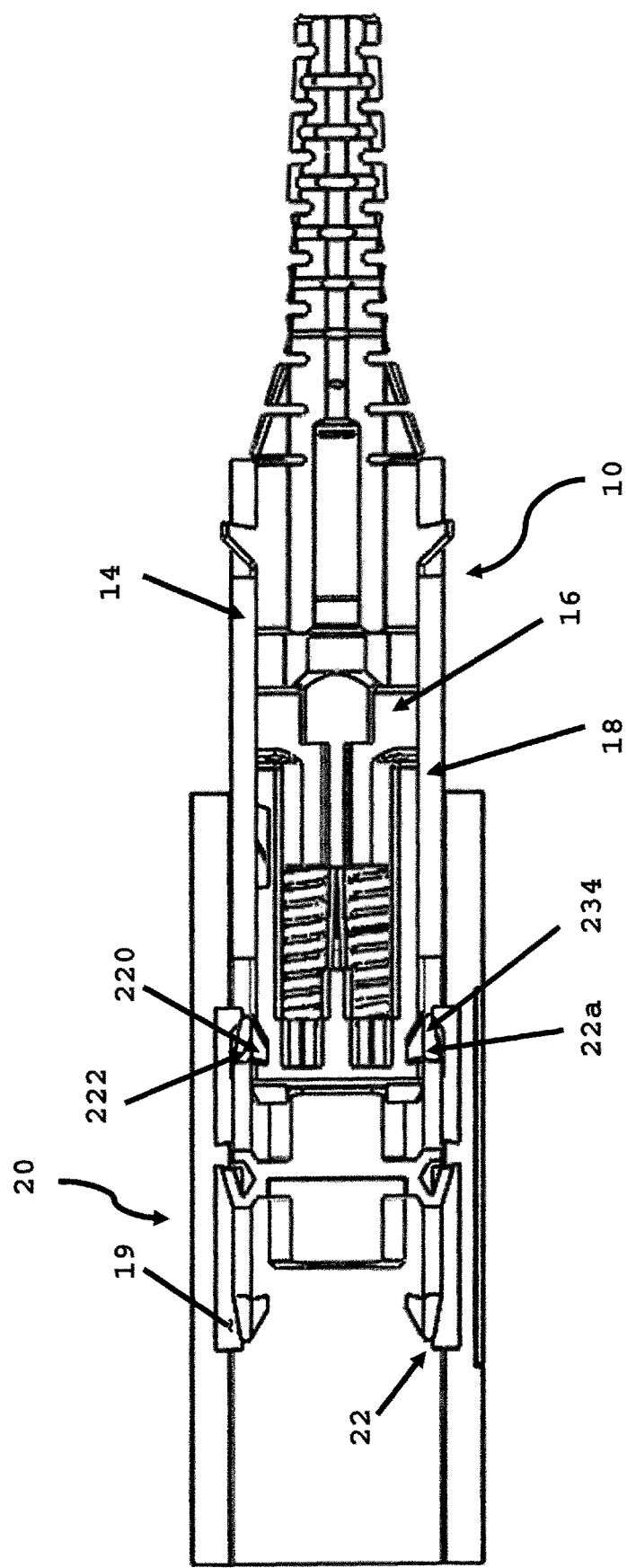
Figure 11A:
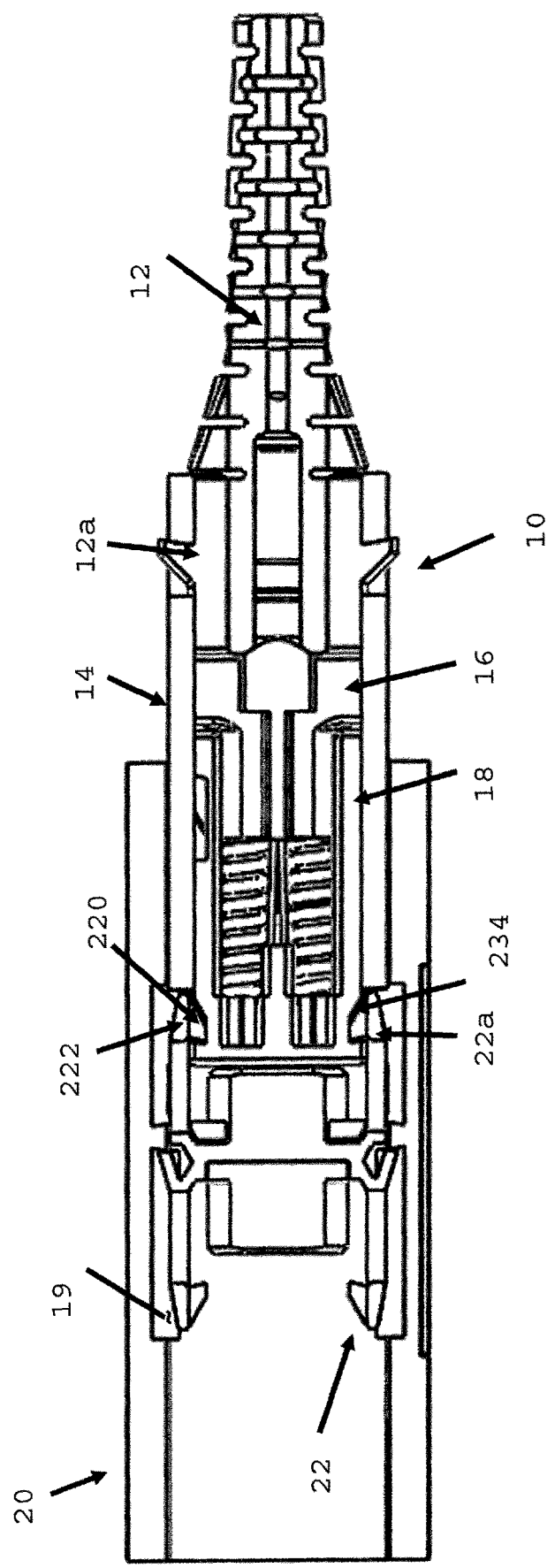

The front end portion of the connector 10 is inserted into the socket of the adapter 10 (FIGS. 10A-10C) until the front section of the camming segments 226 engage the wings 222 of the adapter hooks 22a and the top and bottom edges of the front end of the connector front body 18 engages the end portions of the central locking tabs 220 as shown in FIG. 10C. This engagement causes the adapter hooks 22a to deflect outwardly (e.g., upward and downward) into top and bottom openings 19 such that the top and bottom edges of the front end wall of the connector front body 18 can move forward past the locking tabs 220. After the front end wall of the connector front body 18 moves forward past the locking tabs 220 of the adapter latch 22, it engages the end of alignment sleeve holder 224 (FIG. 10D). The end of alignment sleeve holder 224 prevents further forward movement of the connector front body 18 relative to the adapter 20. FIG. 10D depicts adapter latch 22 received in connector recess 234.

Figure 10E:
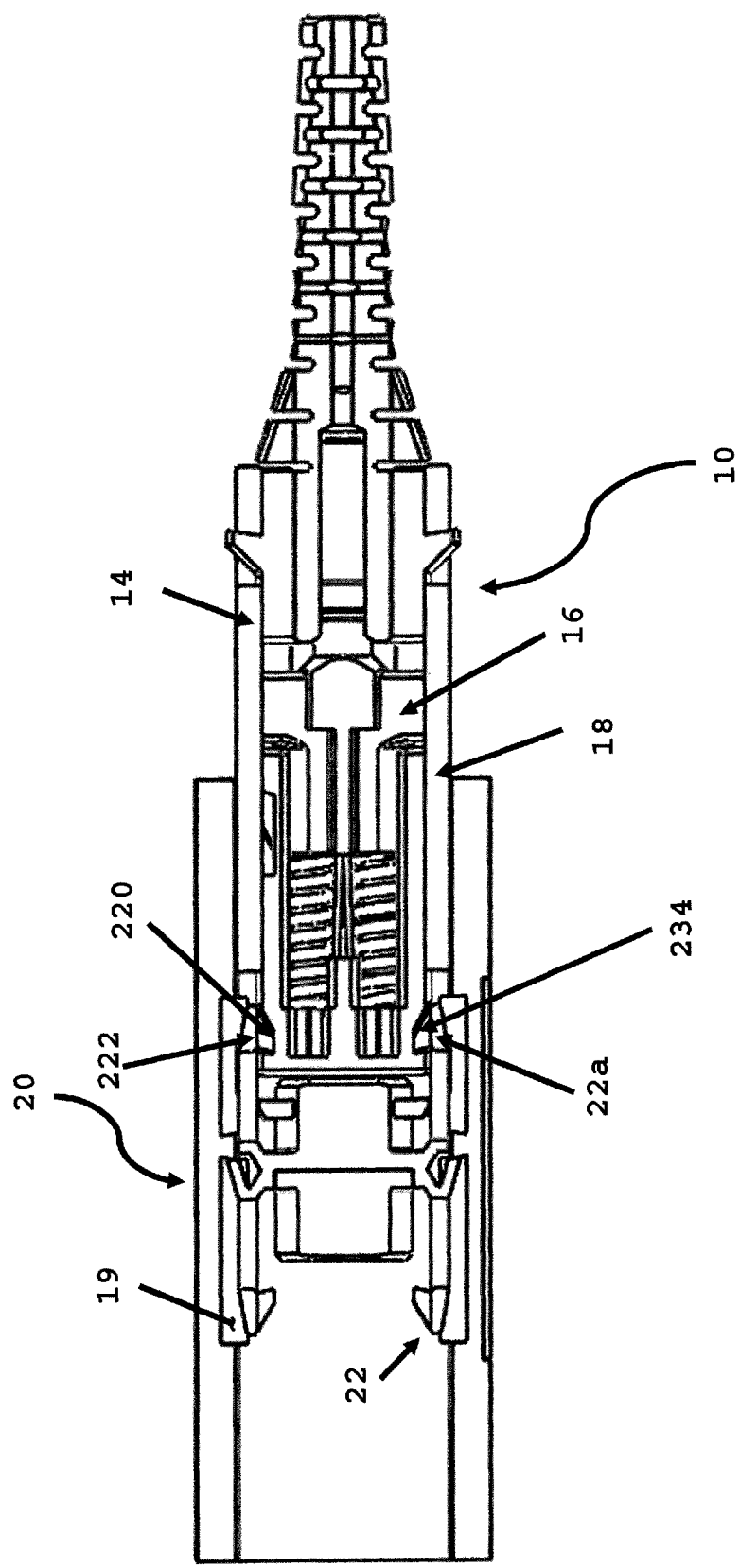
Figure 10F:
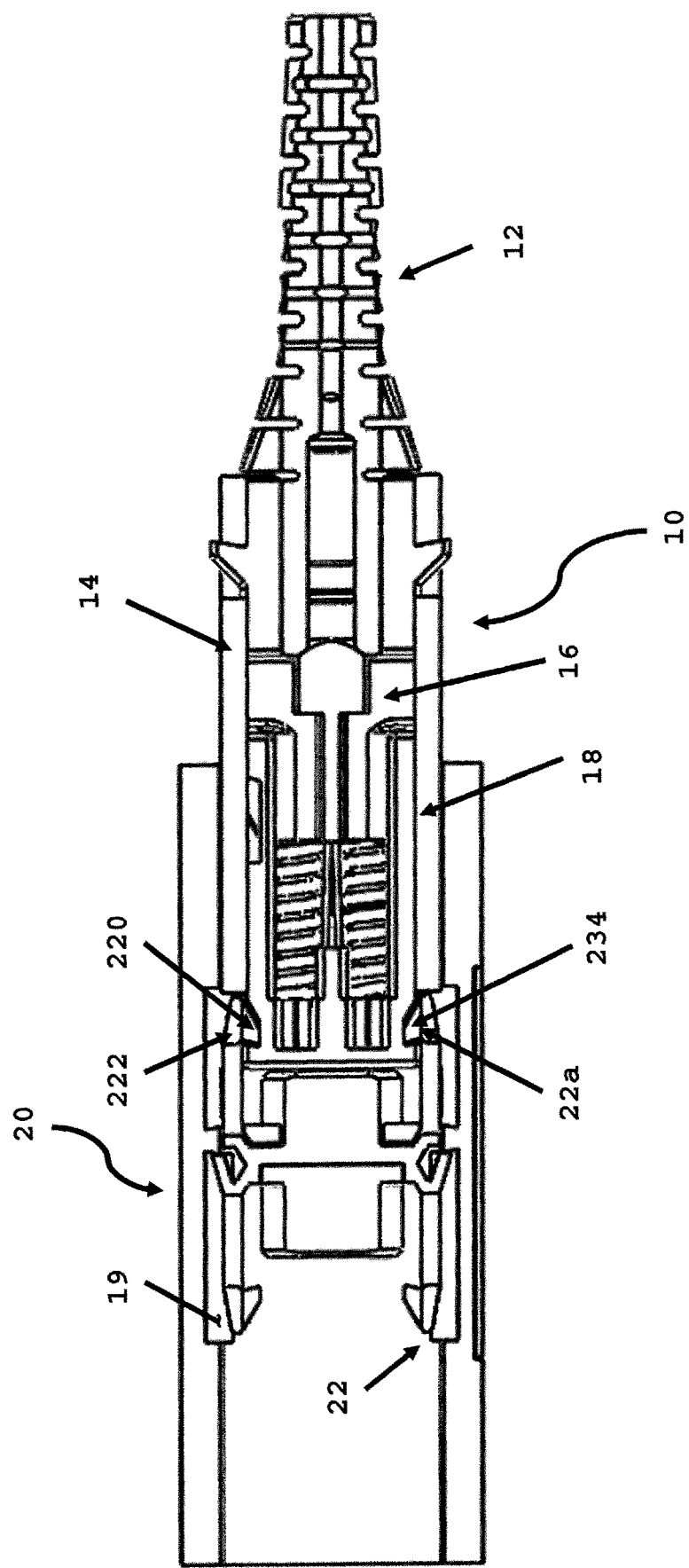

As depicted in FIG. 10E, as the user continues to move the connector 10 forward into the adapter 20 while gripping the boot 12 (FIG. 10E), the boot and the outer housing 14 move forward relative to the connector front body 18, the back body 16, and the adapter 20. The front end wall 14e of the outer housing 14 slidably receives alignment sleeve holder 224 as the outer housing continues to move forward. The camming segments 226 of the outer housing 14 move forward past the wings 222 of the adapter hooks 22a. After the camming segments 226 move forward past the wings 222, the adapter hooks 22a resiliently rebound and deflect inwardly toward one another. The rebounding of the adapter hooks 22a moves the central locking tabs 220 into the locking recesses 234 as shown in FIG. 10F. In this position, locking engagement between the locking tabs 220 and the recesses 234 locks the connector in place with respect to the adapter 20.

Figure 11B:
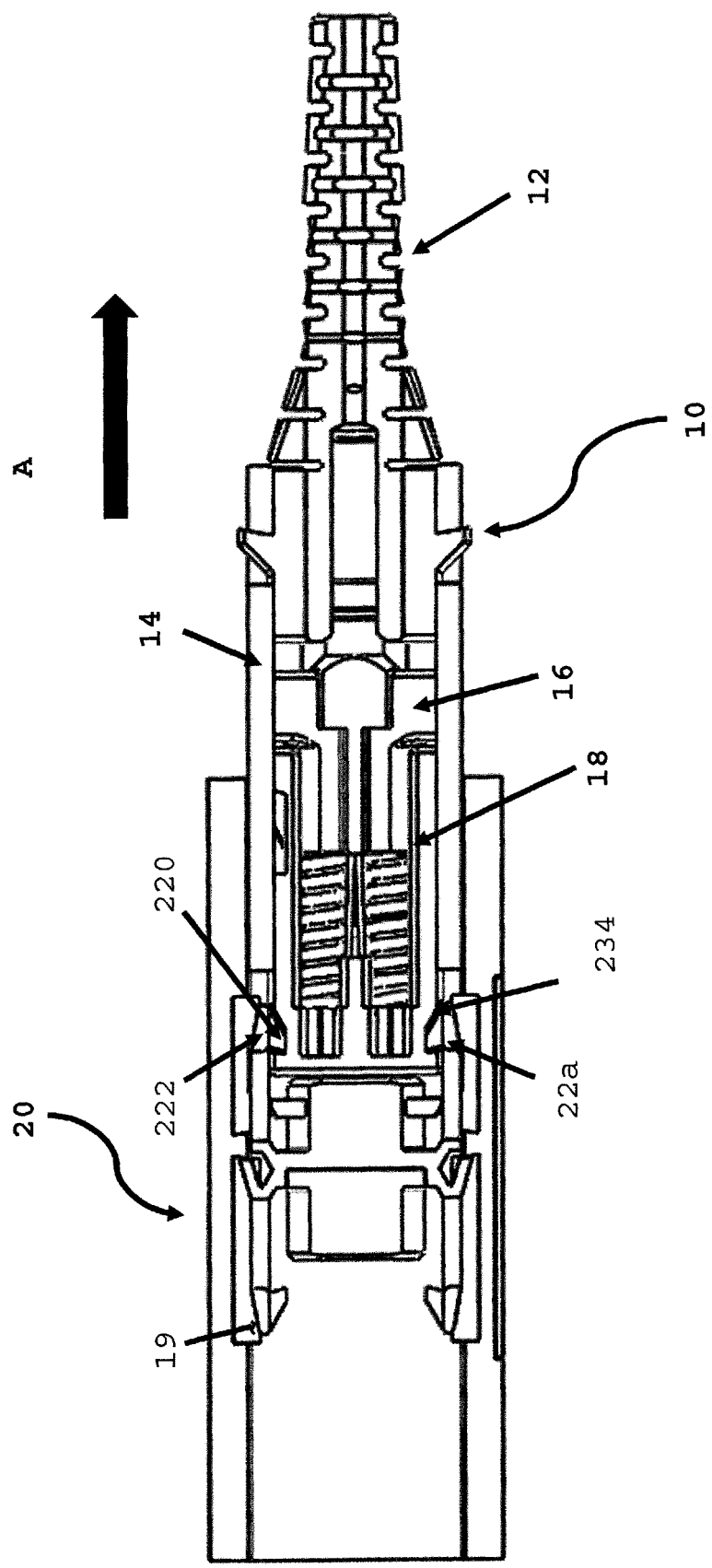
Figure 11C:
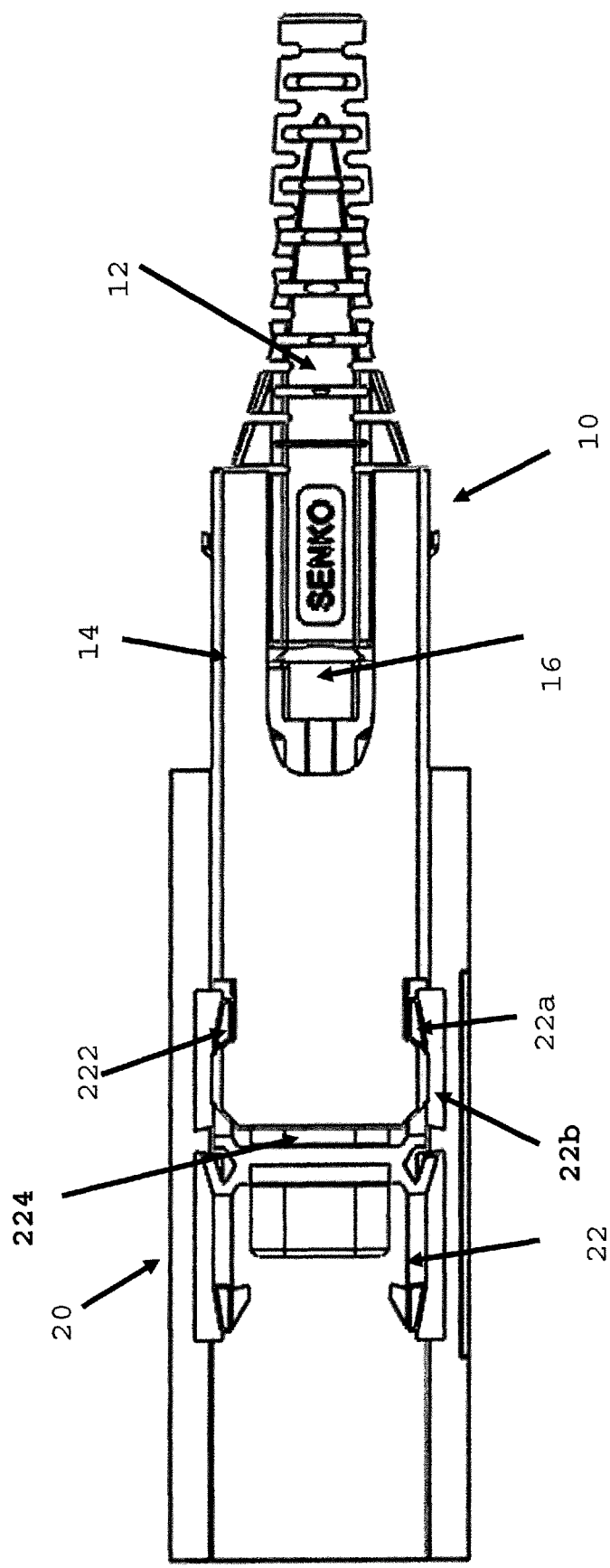

Referring to FIGS. 11A-11H, to remove the connector 10 from the adapter 20 after it has been inserted, a user grips the boot 12 and pulls rearward. The tabs 12a of the boot 12 engage the outer housing 14 to convey the rearward pulling force to the outer housing. The outer housing 14 thus moves rearwardly of the adapter 20 (see FIGS. 11A and 11B). Initially, the locking tabs 220 engage the connector front body 18 and prevent rearward movement of the connector body with the outer housing 14. Thus, the outer housing 14 initially moves rearward relative to the connector front body 18 when the user pulls the cable boot 12 to withdraw the connector. FIG. 11A depicts locking tab 220 of adapter latch 22 retained in connector recess 234. Adapter latch 22 is not within open or recess 19 within adapter 20 outer wall. As depicted in FIG. 11B, as the user pulls in direction of arrow "A" and recess 234 will lift up latch 22. This will release connector from adapter. FIG. 11C depicts connector 10 being removed and alignment sleeve 224 is being exposed.

Figure 11D:
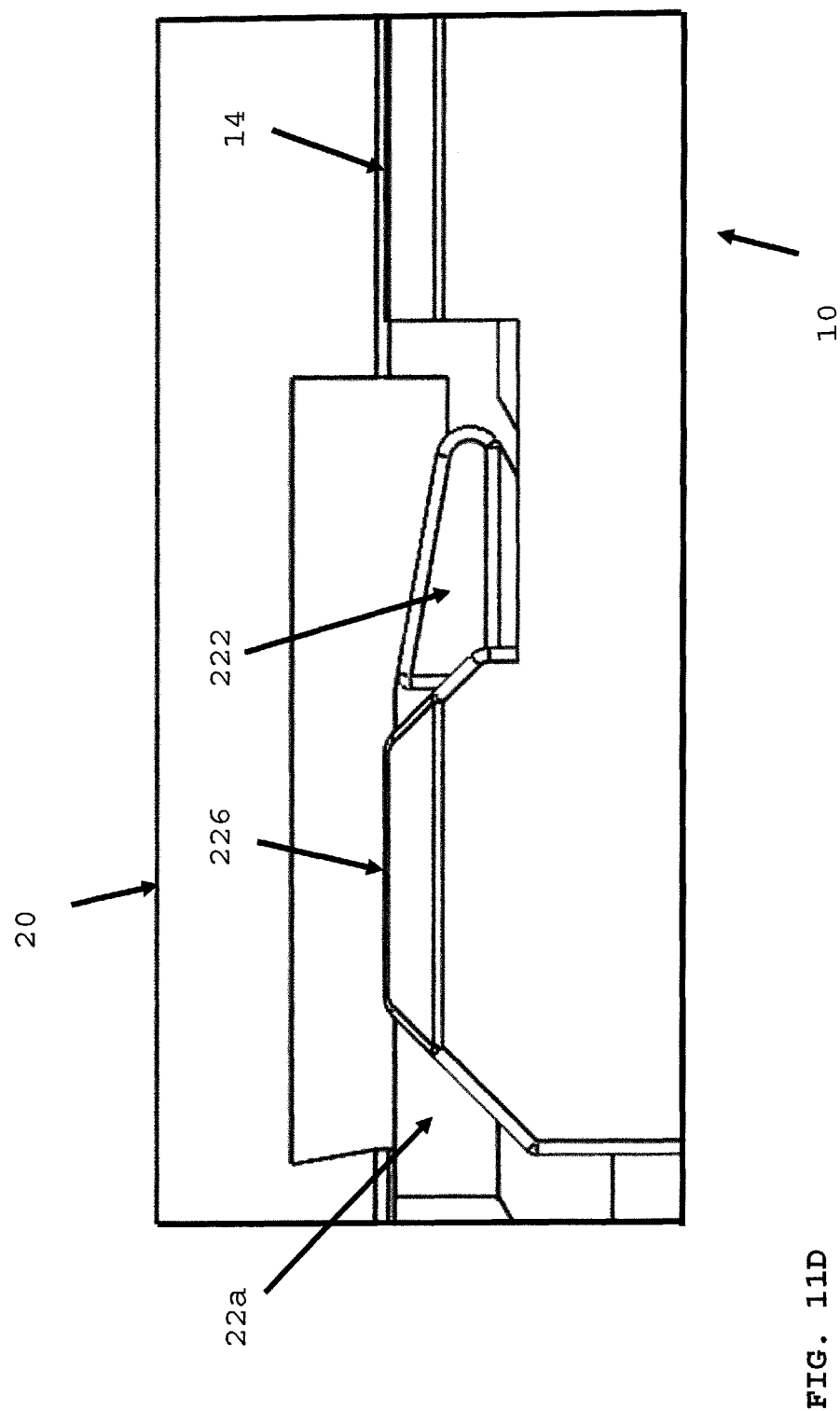
Figure 11E:
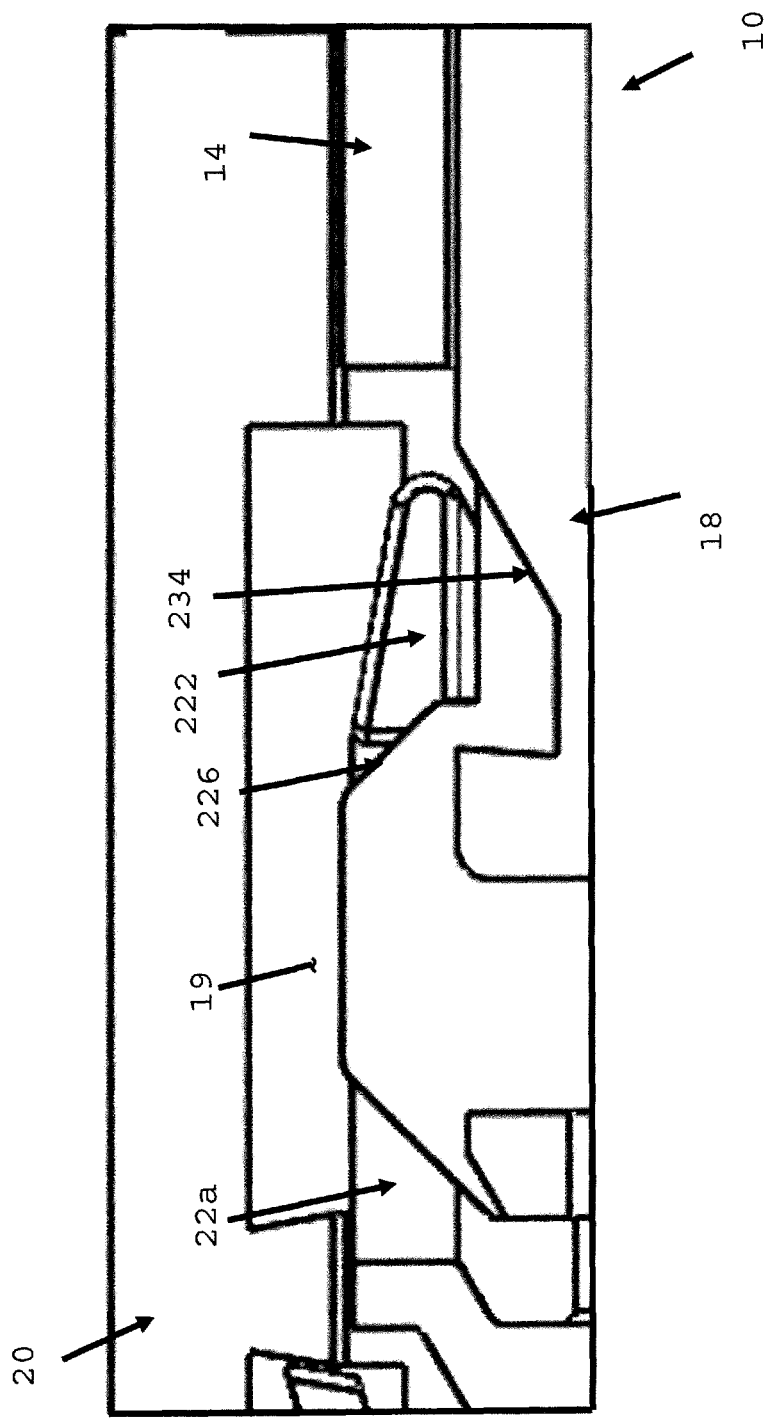
Figure 11G:
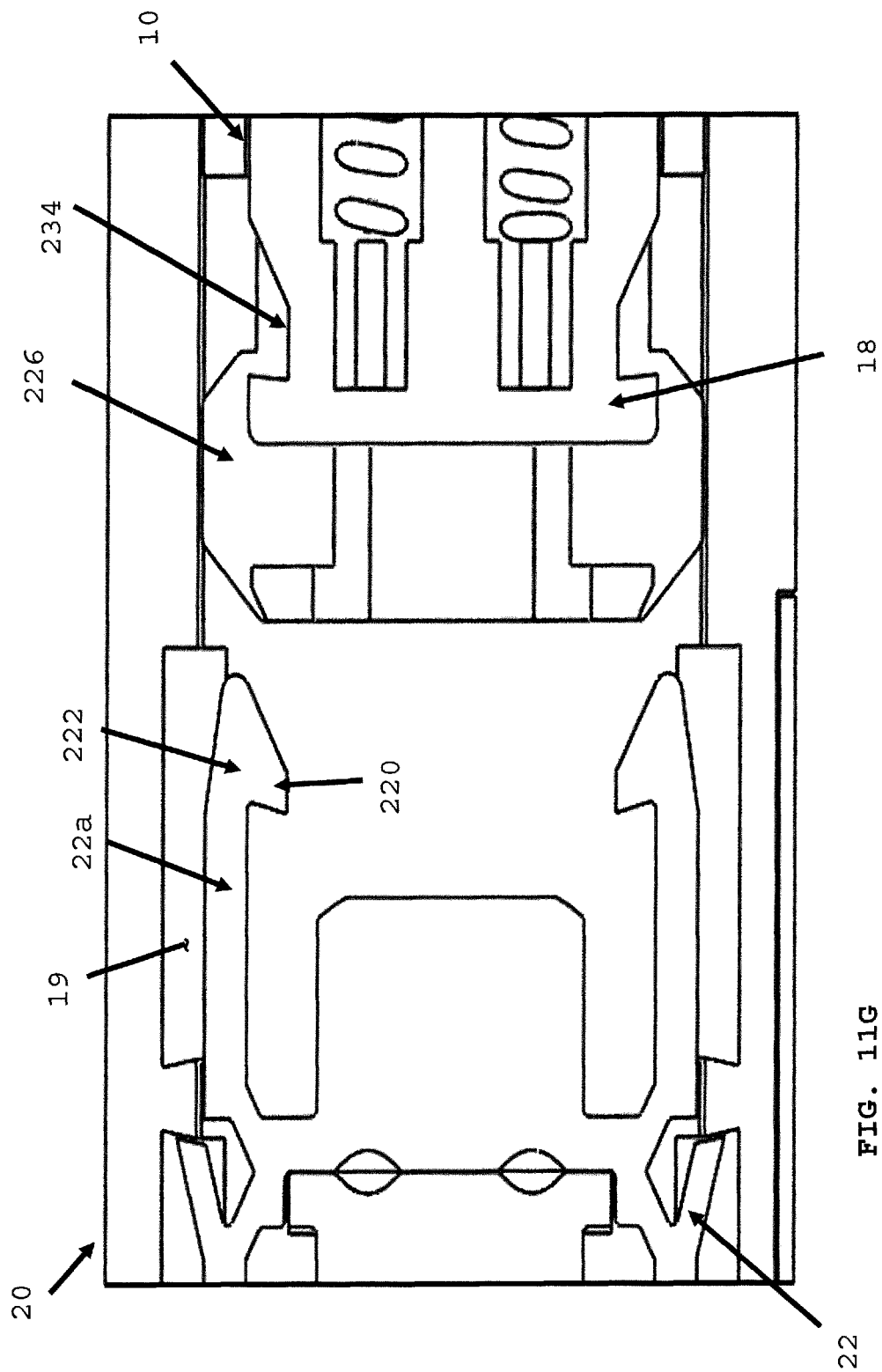
Figure 11H:
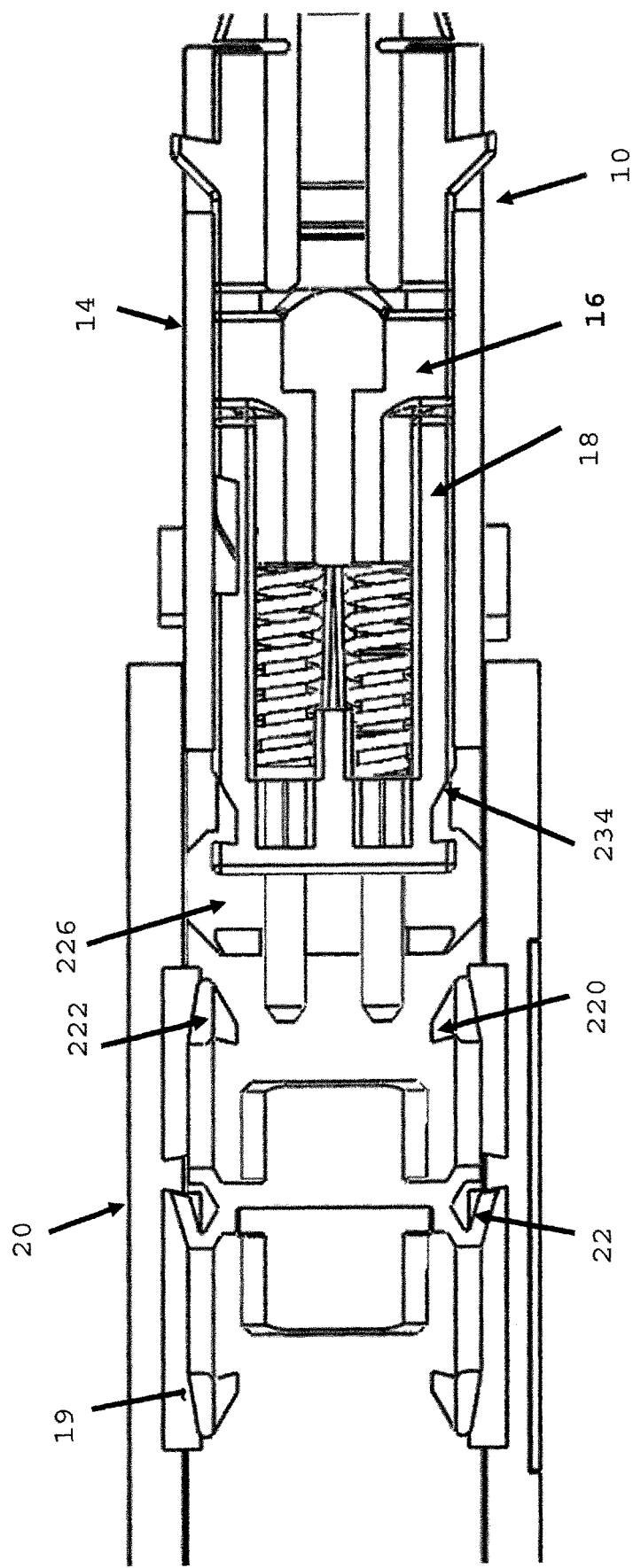

As shown in FIGS. 11C-11F, as the outer housing 14 moves rearward relative to the connector front body 18 and the adapter 20, the camming segments 226 of the outer housing engage the wings 222 of the adapter hooks 22a, causing the adapter hooks to deflect outwardly into the openings 19 of the adapter 20. The outward deflection of the adapter hooks 22a releases the locking tabs 220 from the locking latch recesses 234. After the adapter locking tabs 220 have been released and the outer housing 14 has moved relative to the connector front body 18 such that the front wall engages the front wall of connector front body 18, further rearward movement of the cable boot 12 and the outer housing causes the connector body to move rearward conjointly with the outer housing (see FIGS. 11G and 11H). Thus, the user continues to pull rearward on the cable boot 12 until the connector 10 is withdrawn from the adapter 20. FIG. 11D is zoomed section of FIG. 11C. In FIG. 11C, latch 22 wing 222 is within the connector recess. Cam segment 226 is within recess latch. FIG. 11E depicts cam surface 226 lifting adapter wing 22 into opening 19, as connector is being removed by user as depicted in FIG. 11B. FIG. 11F depicts latch 22a being moved beyond cam surface 226. FIG. 11G depicts cam surface 225 beyond adapter latch 22a wing 222 as user has released connector 10 from adapter 20 port. FIG. 11H depicts FIG. G including connector springs 13 biasing forward front body 18 upon release from adapter port.

Although the sequences of inserting and withdrawing the connector 10 from the adapter 20 are described above as being performed by gripping the cable boot 12 and utilizing the cable boot to impart insertion/withdrawal forces on the connector, it will be understood that a user could also grip the rear end portion of outer housing 14 to insert or withdraw the connector in one or more embodiments.

The latching and unlatching sequences described above reference a single connector in a single socket of the adapter. In some cases, it may be desirable to insert or withdraw a gang of multiple connectors simultaneously. When the clip 680a (FIG. 6) is installed on a gang of connectors 10, all of the connectors can be inserted or withdrawn at the same time by applying an insertion or withdrawal force onto the cable boot (or outer housing) of one or more of the connectors. The clip 680a links the connectors 10 together such the forces imparted on one or more of the cable boots 12 is conveyed to each of the connectors to latch or unlatch all of the connectors from the adapter 20 at the same time and in the same manner as is described above for the single connector 10.

Figure 12:
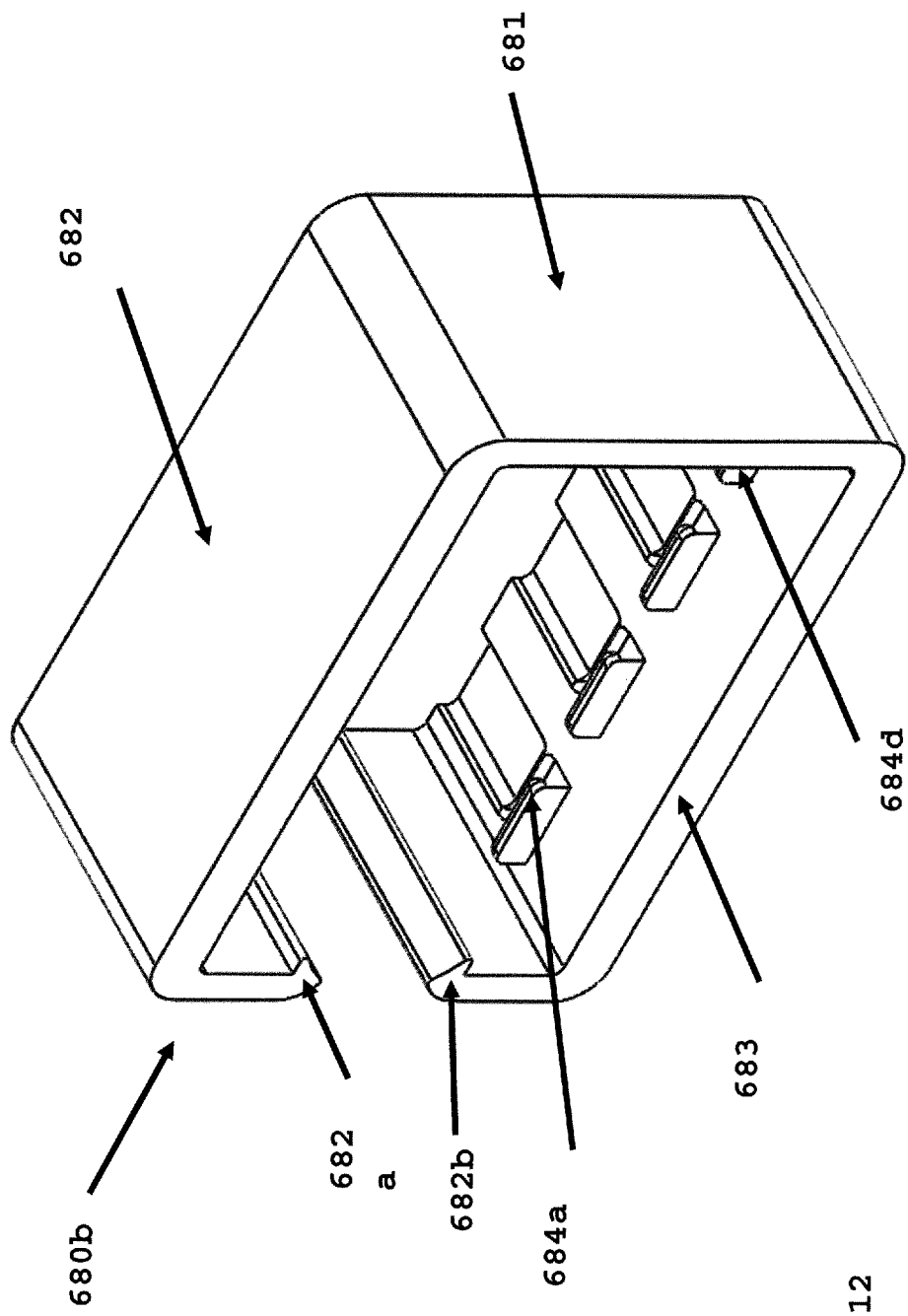
FIG. 12 is a perspective view of a clip according to a second embodiment of the present invention.
Figure 13:
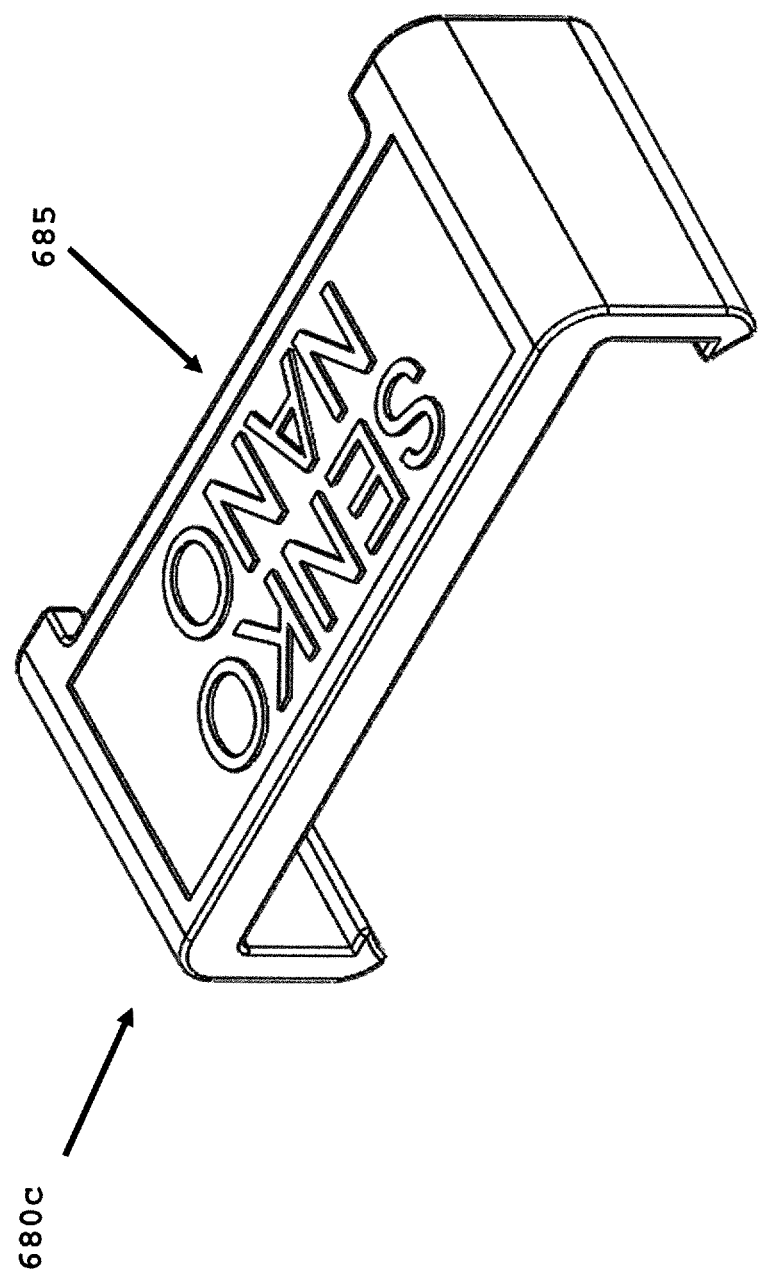
FIG. 13 is a perspective view of a clip according to a third embodiment of the present invention.

FIG. 12 is a perspective view of clip 680b according to a second embodiment of the present invention. Clip 680b is "C" shaped formed from top portion 682, bottom portion 683 connected by side portion 681. Unlike clip 680a and clip 680c, clip 680b is two piece with top portion and bottom portion. Clip protrusions (684a-684d) are accepted in corresponding opposing connector slots (14d1, 14d2) (FIG. 7), which gangs together the plural of connectors 10. FIG. 13 is a top view of clip 680c with recess or cut-out 685. Cut-out 685 allows a user to view each connector for example to determine its current polarity or orientation while inserted into an adapter receptacle.

Figure 14:
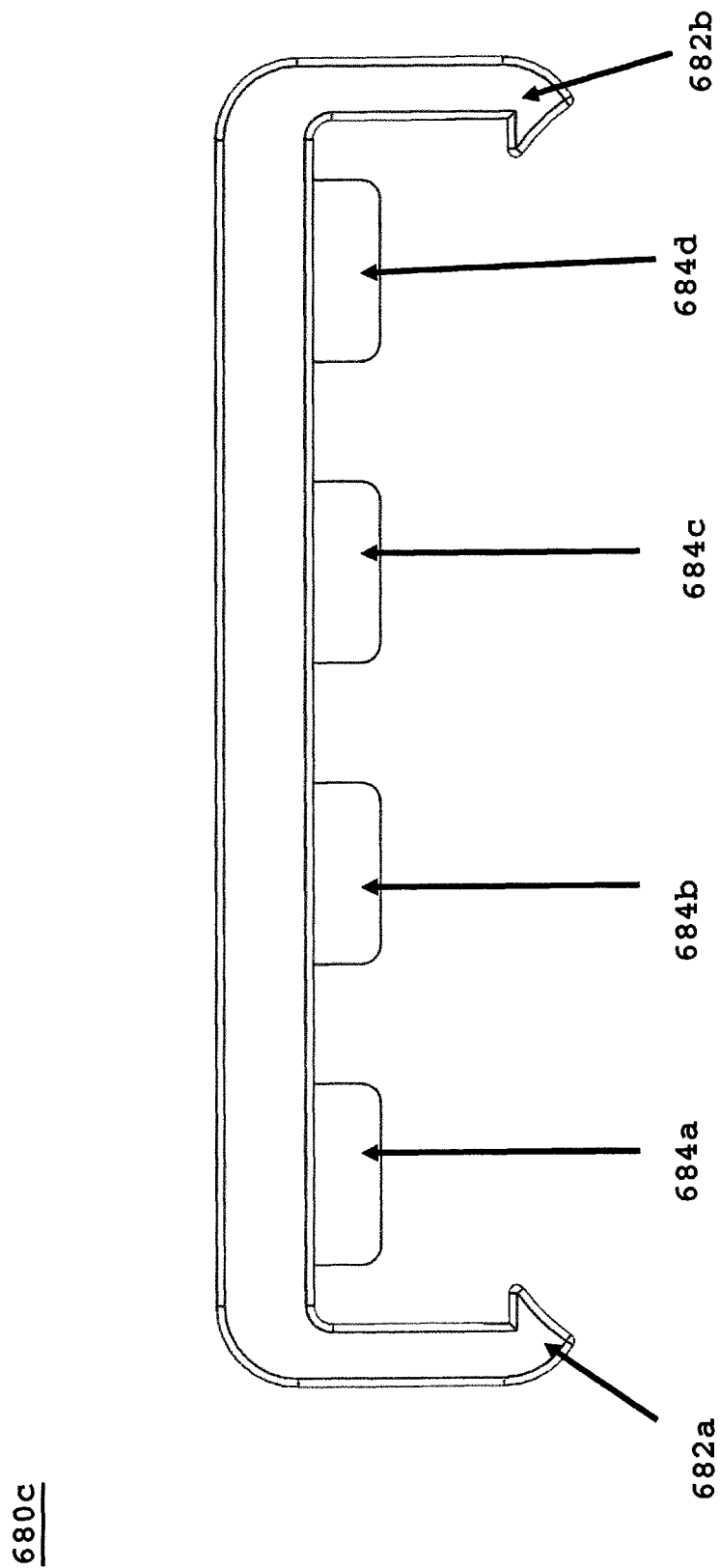
FIG. 14 is a front view of clip of FIG. 13.
Figure 15:
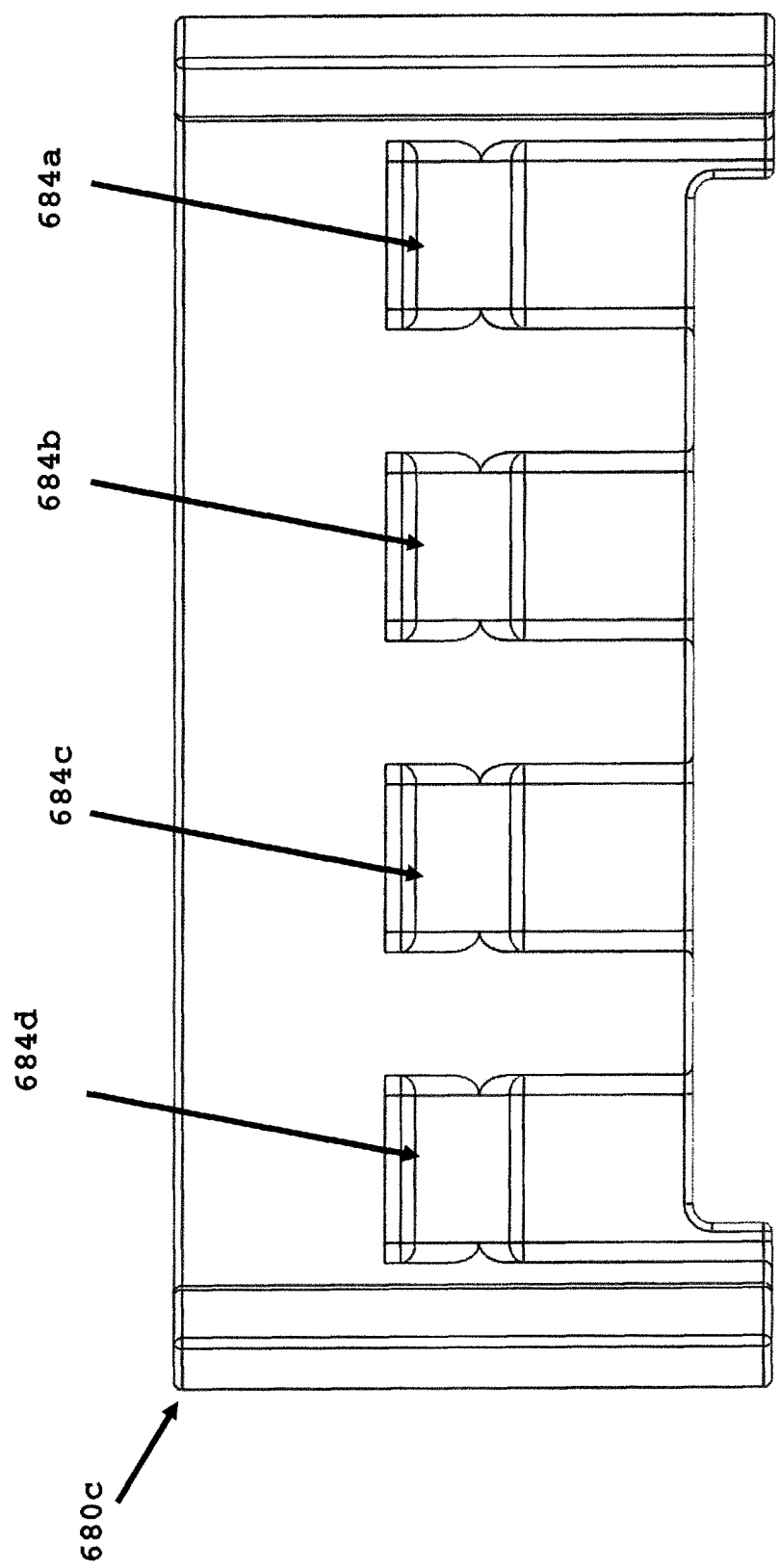
FIG. 15 is a bottom view of clip of FIG. 13.
Figure 16:
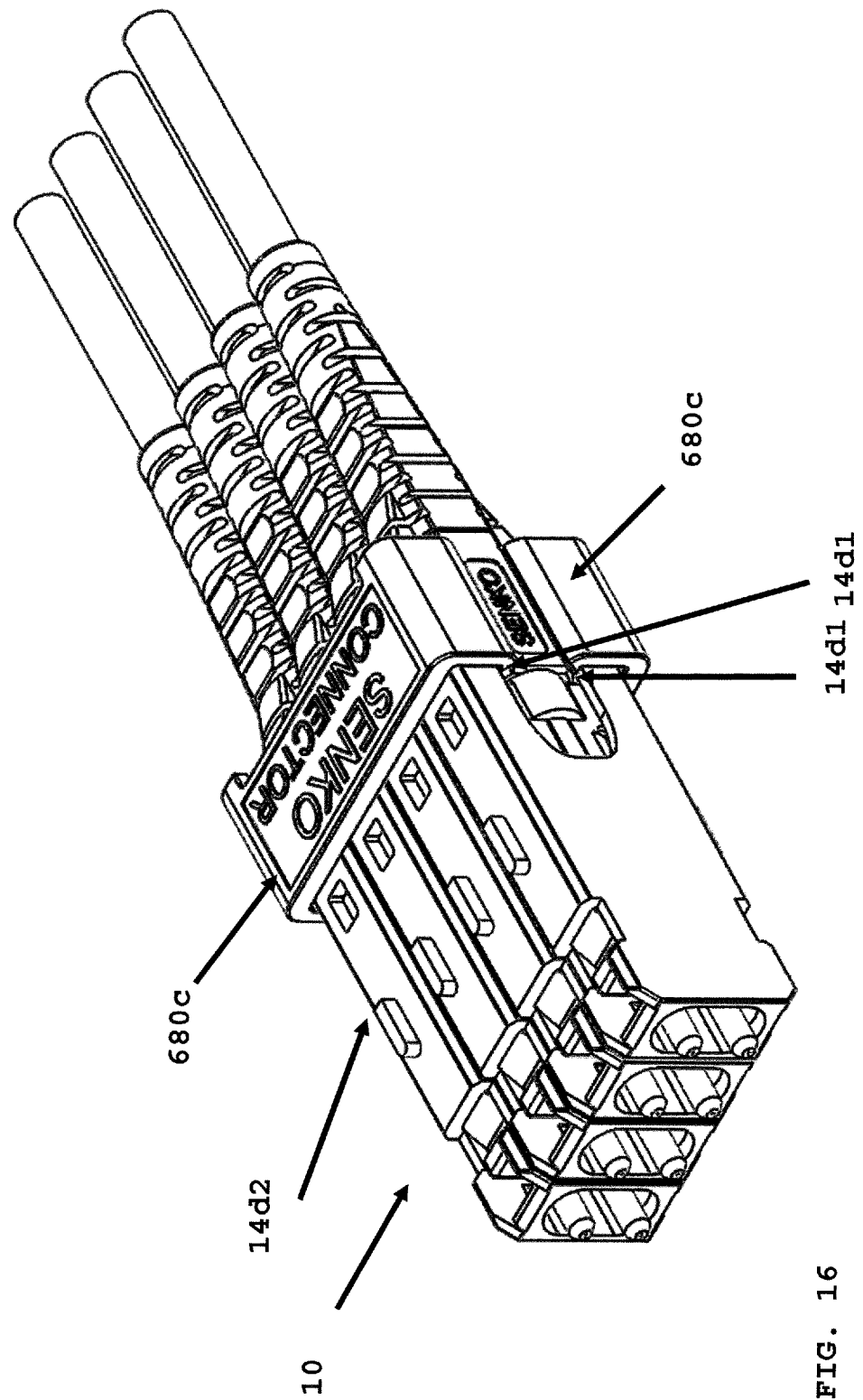
FIG. 16 is a perspective view of a gang of micro-connectors with the clips of FIG. 13.
Figure 17:
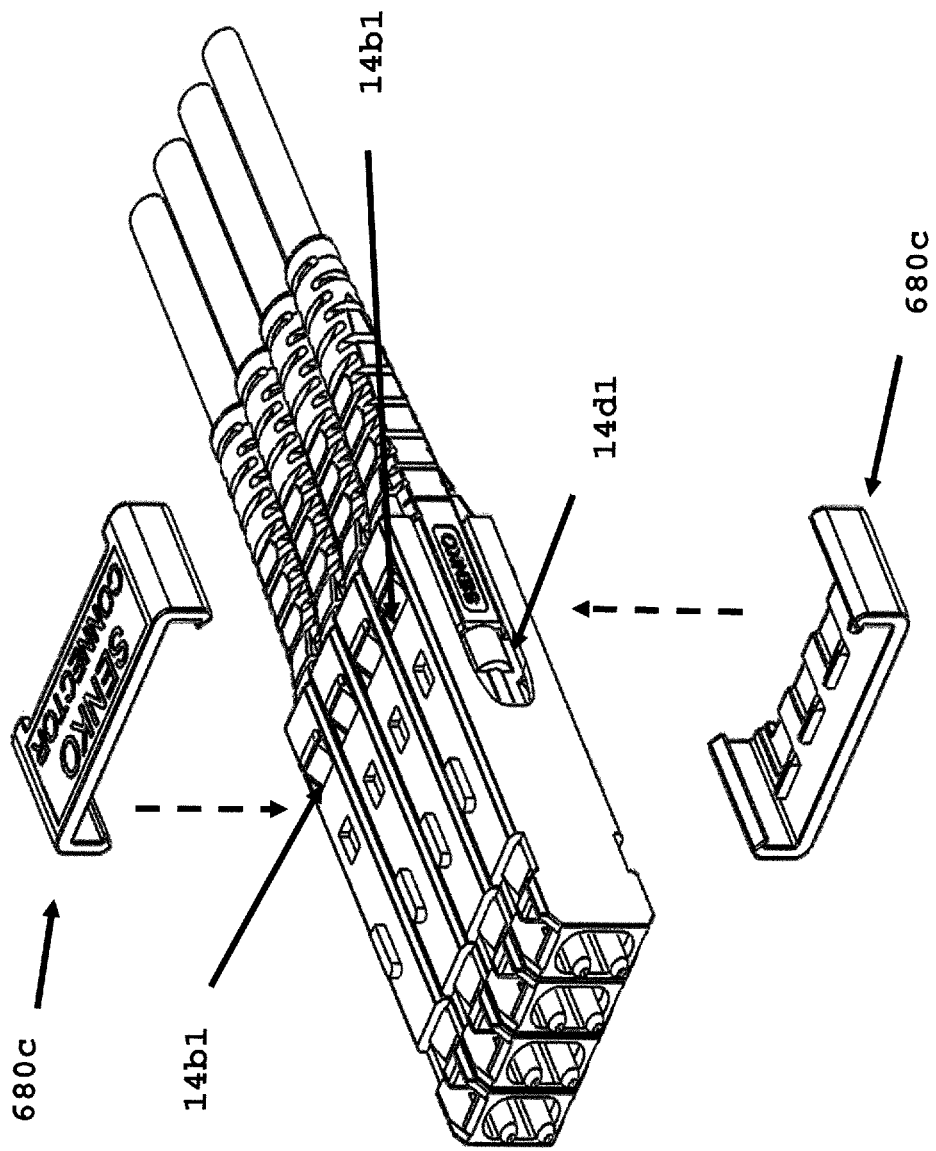
FIG. 17 is an exploded view of the assembly of FIG. 16.

FIG. 14 depicts a front view of clip 680c. Clip 680c has opposing hooks or latches (682a, 682b) formed on either side. The hooks (682a, 682b) are at an end of a corresponding arm that is configured to wrap around housing and snap into opening or slot 14d1, as depicted in FIG. 16 and FIG. 17 below. FIG. 15 depicts an inside view of clip 680c protrusions (684a-648d). These protrusions are deployed on the inside clip 680c. It is understood top clip and bottom clip can be clip 680a, clip 680d or clip 680c without departing from the scope of the invention.

FIG. 16 depicts clip 680c deployed at the top of a plural of connectors 10 and at the bottom of a plural of connectors 10. The hooks are at an end of a corresponding arm that is configured to wrap around housing and snap into opening or slot (14d1, 14d2) on either side of connector housing 14. FIG. 17 depicts an exploded view of clips 680c top and bottom of plural of connectors. Arms are received in opening or slot 14d1. Protrusions (684a-684d) are received in slot (14d1, 14d2) of each connector 10. There is a clip connector opening or slot 14d1 on a first side of connector housing 14, and second connector opening or slot 14d2 on a second side of connector housing 14 for each connector. This allows a top clip 680c and a bottom clip 680c to secured together the plural of connectors. Once secured together, a user may withdraw the plural of connectors from their corresponding adapter port together.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A clip for simultaneously removing a plurality of separately installable fiber optic connectors from an adapter, the clip comprising a first clip member comprising:
    a lateral wall having a first end portion and a second end portion and a width extending laterally from the first end portion to the second end portion, the lateral wall having a thickness and an outer side and an inner side spaced apart along the thickness, the inner side being spaced apart from the outer side in an inward transverse direction;
    a first arm extending generally in the inward transverse direction from the first end portion of the lateral wall to a free end portion, the free end portion of the first arm comprising a first hook protruding laterally inward;
    a second arm extending generally in the inward transverse direction from the second end portion of the lateral wall to a free end portion, the free end portion of the second arm comprising a second hook protruding laterally inward; and
    a plurality of protrusions protruding from the inner side of the lateral wall at laterally spaced apart locations along the width of the lateral wall;
    wherein the first clip member is configured to releasably attach to the plurality of separately installable fiber optic connectors arranged side-by-side in the adapter by being positioned on one of an upper portion and a lower portion of the plurality of separately installable fiber optic connectors such that each of the protrusions is received in a recess of a respective one of the plurality of separately installable fiber optic connectors, the first hook of the first arm latches with a laterally outward facing portion one of the plurality of separately installable fiber optic connectors, and the second hook latches with an opposing laterally outward facing portion of another one of the plurality separately installable fiber optic connectors.

2. The clip for removing two or more fiber optic connectors from an adapter according to claim 1, further comprising a second clip member separate from the first clip member, wherein the second clip member is configured to releasably attach to the plurality of separately installable fiber optic connectors arranged side-by-side in the adapter by being positioned on the other of the upper portion and the lower portion of the plurality of separately installable fiber optic connectors.

3. The clip for removing two or more fiber optic connectors from an adapter according to claim 1, wherein the first clip member has a recess through which a polarity feature of at least one of the plurality of separately installable fiber optic connectors is visible when the first clip member is attached to the plurality of separately installable fiber optic connectors.

4. A clip for removing two or more fiber optic connectors from an adapter comprising:
- a "C" shaped clip member comprising"
    - an upper lateral wall and a lower lateral wall, each of the upper lateral wall and the lower lateral wall having a first end portion and a second end portion and a width extending laterally from the first end portion to the second end portion,
    - a connecting portion extending vertically from the second end portion of the upper lateral wall to the second end portion of the lower lateral wall and holding the upper lateral wall in vertically spaced apart relation from the lower lateral wall,
    - a first arm extending from the first end portion of the upper lateral wall toward the lower lateral wall to a free end portion, the free end portion of the first arm comprising a first hook protruding laterally inward,
    - a second arm extending from the first end portion of the lower lateral wall toward the upper lateral wall to a free end portion, the free end portion of the second arm comprising a second hook protruding laterally inward;
    - a plurality of protrusions protruding from one of the upper lateral wall and the lower lateral wall toward the other of the upper lateral wall and the lower lateral wall at laterally spaced apart locations;
    - wherein the clip is configured to releasably attach to the plurality of separately installable fiber optic connectors arranged side-by-side in the adapter by being positioned to extend circumferentially around the plurality of separately installable fiber optic connectors such that each of the protrusions is received in a recess of a respective one of the plurality of separately installable fiber optic connectors and the first and second hooks each latch with a laterally outward facing portion one of the plurality of separately installable fiber optic connectors.

* * * * *